United States Patent [19]
Sato et al.

[11] Patent Number: 5,181,217
[45] Date of Patent: Jan. 19, 1993

[54] LASER OSCILLATOR CIRCUIT

[75] Inventors: Yukio Sato; Akihiro Suzuki; Mitsuo Inoue; Kenyu Haruta; Haruhiko Nagai, all of Amagasaki, Japan

[73] Assignee: Mitsubishi Denki Kabushiki Kaisha, Tokyo, Japan

[21] Appl. No.: 727,432

[22] Filed: Jul. 9, 1991

[30] Foreign Application Priority Data

Feb. 27, 1991 [JP] Japan .................................. 3-33024
Feb. 28, 1991 [JP] Japan .................................. 3-34381

[51] Int. Cl.$^5$ ............................................. H01S 3/00
[52] U.S. Cl. ........................................ 372/38; 372/25; 372/86
[58] Field of Search ............................ 372/25, 38, 86

[56] References Cited

U.S. PATENT DOCUMENTS 4,887,773 6/1989 Wakata et al. ........................ 372/86
5,090,021 2/1992 Nakatani et al. ...................... 372/86
5,097,472 3/1992 Chenausky ............................ 372/38

*Primary Examiner*—Léon Scott, Jr.
*Attorney, Agent, or Firm*—Oblon, Spivak, McClelland, Maier & Neustadt

[57] ABSTRACT

A discharge pumping circuit of spiker/sustainer type for the Excimer laser oscillator, wherein spiker unit is isolated from the sustainer unit by a switching device such as a magnetic isolator is disclosed. In the pumping circuit, the switching device shifts from its OFF state to its ON state, during the process of charging a spiker capacitor, before its terminal voltage reaches a voltage which initiates the discharge, and a sharp-rise pulse voltage is applied by a transfer of electric charge from said sustainer capacitor to said spiker capacitor, to initiate the discharge for the pumping. In another discharge-pumping circuit which also has a means for preionizing the laser gas, the timing for the preionization is set to start after the initiation of charging the sustainer capacitor and before the initiation of charging the spiker capacitor in a polarity opposite to that of the sustainer capacitor, and is controlled for maintaining the discharge initiating voltage constant for the repetition frequency. In another discharge-pumping circuit, a power source for charging the sustainer capacitor is structured to include a magnetic pulse compression circuit to reduce the stress on a high voltage switch such as a thyratron in the circuit to realize an excellent performance, a long service life and a high reliability.

11 Claims, 31 Drawing Sheets

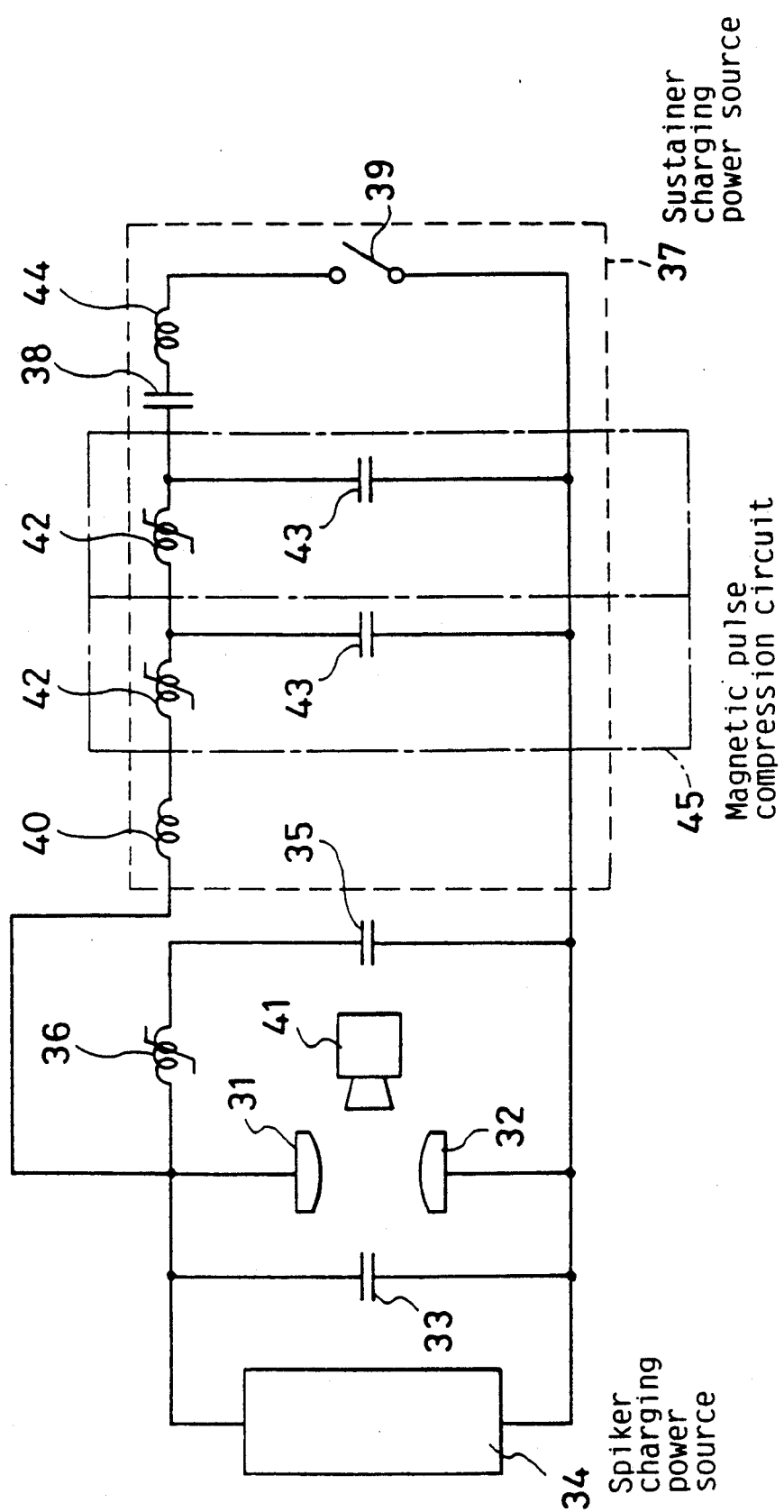

34 Spiker charging power source

37 Sustainer charging power source

LASER OSCILLATOR CIRCUIT

FIELD OF THE INVENTION AND RELATED ART STATEMENT

1. Field of the Invention

The present invention relates to a laser oscillator circuit and, in particular, it is concerned with an improvement in or relating to a repetitive operation characteristics in a repetition-pulse type laser device which emits a laser radiation by a pulsative discharge-pumping in the field of gas laser.

2. Description of the Prior Art

Although not disclosed in detail, nor explicitly, a typical schematic diagram of the pulse-discharge pumping circuit in a diode mode of the conventional laser oscillator circuit would be assumed as is shown in FIG. 25. The exemplified circuit is built based on an aspect of the disclosure in Applied Physics Letter Vol. 48, No. 23, Jun. 9, 1986. pp. 1574–1576.

In this schematic diagram, the conventional pulse-discharge pumping circuit comprises mainly a laser housing 1, a spiker capacitor 6, a power source 7 which is for charging the spiker capacitor 6 (spiker charging power source), a sustainer capacitor 11, a power source for charging the sustainer capacitor 11 (sustainer charging power source).

The laser housing 1 contains a laser gas 2 sealed in this housing 1 at a predetermined pressure. A first main electrode 3 and a second main electrode 4 are provided in a mutually facing relationship in the atmosphere of this laser gas 2, wherein a excitation discharge 5 is to be induced across the main electrodes 3 and 4.

The spiker capacitor 6 is connected across the main electrodes 3 and 4 for supplying energy in order to initiate a uniform excitation discharge 5 between the main electrodes 3 and 4 by applying to them a sharp-rise pulse voltage, whose rising speed is 200–400 kV/$\mu$ sec., typically.

The spiker charging power source 7 comprises a direct-current high voltage power source 8, a pulse charging capacitor 9 and a switch $SW_1$ 10 connected across the capacitor 9 and the spiker capacitor 6.

The sustainer capacitor 11 is connected in parallel with the sustainer charging power source 12, and further to the main electrode 3 through a magnetic isolator 13 and to the other main electrode 4 directly. The sustainer charging power source 12 supplies a main energy for maintaining the excitation discharge 5 generated between the main electrodes 3 and 4. The magnetic isolator 13 performs switching of supplying the energy stored in the sustainer capacitor 11 to the first and second main electrodes 3 and 4.

In the following paragraphs, an operation of the conventional pulse-discharge pumping circuit will be described with reference to FIG. 26. First, the sustainer capacitor 11 is charged by the sustainer charging power source 12 up to a predetermined charging voltage $V_{OPFN}$. Next, the spiker capacitor 6 is charged by the spiker charging power source 7, wherein the pulse charge capacitor 9 has previously been charged by the D.C. high voltage power source 8 and then the switch $SW_1$ is turned to ON state. On that state, the electric charge stored in the pulse charge capacitor 9 transfers suddenly to the spiker capacitor 6 and applies a sharp-rise pulse voltage to the pair of the first and the second main electrodes 3 and 4 connected in parallel with the spiker capacitor 6.

When the voltage developed across the first and second main electrodes 3 and 4 reaches a breakdown voltage $V_b$, the electric charge stored in the spiker capacitor 6 flows into the space or gap between the pair of the first and second main electrodes 3 and 4 at a breath to initiate the excitation discharge 5. After a short lapse of time, an energy for pumping the laser is injected from the sustainer capacitor 11 and a laser radiation of the output power P is emitted in the direction perpendicular to the plane of paper.

Under the stated circumstances, in case where a laser gas 2 in the region where the excitation discharge 5 takes place is ionized uniformly in advance of or simultaneously with the voltage application to the first and second main electrodes 3 and 4 by means of an X-ray, ultra violet ray, or ultra violet laser radiation, the excitation discharge 5 makes a uniform discharge required for the intended laser pumping.

After lapse of some time period from the initiation of the uniform discharge between the main electrodes 3 and 4 by the energy, which has been previously stored in the spiker capacitor 6, the magnetic isolator 13 shifts to its ON state. At that time, the energy stored in the sustainer capacitor 11 is flown into a space between the main electrodes 3 and 4 to initiate a laser oscillation.

The waveform diagrams shown in FIG. 26, each represents time charts of:

(a) the voltage $V_g$ (on ordinate) across the main electrodes 3 and 4, (b) the current $i_n$ (on ordinate) from the sustainer capacitor 11 to the main electrodes 3 and 4, and (c) the output power P (on ordinate) of laser.

As above-described, by applying the sharp-rise pulse voltage to the pair of the main electrodes 3 and 4 from the spiker capacitor 6 to induce the uniform excitation discharge 5, a discharge resistance of the gas in a region between the main electrodes 3 and 4 is reduced to a value of a quasi-steady state. Then, the main energy required for laser pumping is injected into the the region between the main electrodes 3 and 4, from the sustainer capacitor 11 having a characteristic impedance which is equal to the value of the discharge resistance. Such a discharge-pumping circuit system is advantageous because it is able to effectively inject the energy into a laser gas of a low discharge resistance as used in the Excimer laser. This discharge-pumping circuit system is generally called a spiker/sustainer circuit system.

Incidentally, in order to perform the laser pumping in said circuit system effectively, it is important to initiate a uniform discharge pumping by injecting the energy stored in the spiker capacitor 6. One of the countermeasures therefor is to apply a voltage which has a rapid rise-up to the pair of the main electrodes 3 and 4 to initiate the discharge at a voltage which is sufficiently high with respect to a breakdown voltage at the time of applying a D.C. voltage or a slow rise-up D.C. voltage.

The rise-up of the voltage across the main electrodes 3 and 4 in the conventional discharge circuit is determined by a transfer rate of the electric charge from the pulse-charging capacitor 9 to the spiker capacitor 6. This fact will be quantitatively illustrated referring to an equivalent circuit shown in FIG. 27, which corresponds to the discharge pumping circuit shown in FIG. 25.

In the equivalent circuit, a numeral 14 designates a stray inductance $L_1$ of a loop through which the inter-capacitance charge-transferring current $i_t$ flows from the the pulse-charge capacitor $C_3$ to the spiker capacitor $C_2$ through the switch $SW_1$ 10. A numeral 15 designates a line resistance $R_1$ of the loop of the current $i_t$, a numeral 16 designates an equivalent switch $SW_d$ for the excitation discharge 5, a numeral 17 designates a stray inductance $L_d$ for the circumference around the excitation discharge 5, and a numeral 18 designates a line resistance $R_d$ for the circumference around the excitation discharge 5. A numeral 19 designates a stray inductance $L_s$ in a loop through which the discharge current $i_n$ flows from the sustainer capacitor $C_1$ 11 to a region of the excitation discharge 5, and a numeral 20 designates a line resistance $R_s$ in the loop of the current $i_n$.

If an initial charging voltage for the pulse charging capacitor 9 is given by $V_{30}$, an average rise-up rate of the voltage up to a point of time when the charging voltage $V_2$ for the spiker capacitor 6 reaches its peak voltage, $(dV_2/dt)_{ave}$, is given by the following formula:

$$(dV_2/dt)_{ave} = \frac{2\beta}{\pi} \left( \frac{q_{2S}}{c_2} - V_{OPFN} \right) \quad (1)$$

$$\text{wherein, } \beta = \left( \frac{1}{L_1 c_{23}} \right)^{\frac{1}{2}}$$

$$q_{2S} = c_{23} \left( V_{30} + \frac{c_2}{c_3} V_{OPFN} \right).$$

If, $c_2 = c_3$ is given as, $$(dV_2/dt)_{ave} = \frac{\beta}{\pi} (V_{30} - V_{OPFN}) \quad (2)$$

wherein, $c_1$, $c_2$, and $c_3$, each represents capacitance of the capacitor 11, 6 or 9, and;

$$c_{23} = \frac{c_2 \times c_3}{c_2 + c_3}.$$

In addition, the line resistance $R_1$ is neglected because it is sufficiently small to be ignored.

When typical values are given as;
$L_1 = 800$ nH,
$c_2 = c_3 = 6$ nF,
$V_{30} = 50$ kV, and
$V_{OPFN} = 10$ kV,
$(dV_2/dt)_{ave} = 260$ kV/$\mu$s is established but it does not represent a sufficiently rapid rise-up. In order to improve the rise-up characteristics, it is appreciated from the above-mentioned formula (2) that it is effective to reduce the stray inductance $L_1$ in the loop of the current $i_t$.

The intended reduction is however difficult because the reduction is limited by a structural inductance of a thyratron or the like switching means, which performs a switching in a repetitive oscillation at a high repetitive rate of say, hundreds times for a second is to be performed. In addition to this, in the circuit as shown in FIG. 25, a quiescent period for a given length lapses exist from the initiation of the spiker discharge at the voltage $V_b$ to a time when the current $i_n$ start to flow from the sustainer capacitor 11, which has previously been charged to $V_{OPFN}$, as illustrated by the waveform diagrams (a) and (b) shown in FIG. 26. The quiescent period is attributable to a generation of magnetic flux in a direction whereby the magnetic isolator 13 is turn to its reset state during a period up to the initiation of the spiker discharge, from turning ON of the switch $SW_1$ 10. In order to turn the magnetic isolator 13 to its set state, it is required to generate a magnetic flux whose direction is opposite to said magnetic flux. In other words, the current $i_n$ is stopped during a period until the hatched area $S_2$, which is equivalent to that of $S_1$, is attained in the waveform diagram (a) of $V_b$ shown in FIG. 26.

According to the experimental results by the present inventors, it was found that (1) when a repetitive oscillation is performed in this operational mode, the uniformity of the spiker discharge was not maintained due to the presence of the quiescent period, and that (2) the output was saturated or reduced for the frequency exceeding 300 Hz of the repetitive oscillation.

As a means for solving this problem, a circuitry of a "switching mode" is proposed based on the disclosure of the paper in Applied Physics Letter, Vol. 48, No. 23, pp. 1574–1576. The circuitry in this "switching mode" is shown in FIG. 28 and its waveform diagrams are shown in FIG. 29.

In FIG. 28, a numeral 21 designates a spiker reverse-charging power source which has an opposite polarity with respect to that of the sustainer charging power source 12 and a numeral 22 designates an opposite polarity D.C. high voltage power source which realizes the spiker revere-charging power source 21.

The circuitry shown in FIG. 28 is in a close similarity with that shown in FIG. 25 but is different therefrom in the point that (1) the charging polarity of the spiker reverse-charging power source 21 is opposite to that of the sustainer charging power source 12, and (2) in the point of connecting the sustainer charging power source 12 to the laser device.

This circuitry of FIG. 28 is designed to perform the laser oscillation as follows. First, the sustainer capacitor 11 has previously been charged in the positive polarity by the sustainer charging power source 12, and at a time point when the voltage across the sustainer capacitor 11 reaches the charged voltage $V_{OPFN}$, the spiker capacitor 6 is charged in the negative polarity by the spiker reverse-charging power source 21. Thereafter, at a time point when the voltage $V_g$ across the main electrodes 3 and 4 reaches a negative breakdown voltage $V_b$, the energy stored in the spiker capacitor 6 is injected into the region of the excitation discharge 5 at a breath to induce a spiker discharge. On the other hand, the magnetic isolator 13 performs switching by a product V·t represented by the hatched area $S_3$ of the waveform diagram (a) shown in FIG. 29 to allow the pumping current to flow from the sustainer capacitor 11 into the discharging region.

In this case however, since the process of charging the spiker capacitor 6 in the negative direction is in a direction for setting the magnetic isolator 13, the quiescent period to the initiation of flowing out of the sustainer current as having been observed with the "diode mode" is barely found. In a case wherein the magnetic core area of the magnetic isolator 13 is designed so that the quiescent period may be sufficiently short, the laser oscillation initiates immediately after the flowing out of the current from the sustainer capacitor 11 by the pumping due to spiker discharge and the oscillation of a higher output at a higher efficiency than that of the "diode mode" is realized. In the "switching mode", the reason for connecting the sustainer charging power source to a position different from the case of the previously-described diode mode is to turn the magnetic isolator 13 to its reset state by the current flown for charging the sustainer capacitor.

Incidentally, the rise-up velocity of the spiker voltage in the switching mode is calculated by the above-mentioned formula (2) in the conditions:

$L_1 = 800$ nH,
$C_2 = C_3 = 6$ nH,
$V_{30} = -50$ kV, and
$V_{OPFN} = 10$ kV.

Then, $(dV_2/dt)_{ave} = 390$ kV/$\mu$s is derived.

Although this value is 1.5 times larger than that of the circuitry according to the diode mode, it is still not sufficient for realizing the intended uniform spiker discharge. In addition to this, the direction of the current flown out from the spiker capacitor in the switching mode is opposite to that flown out from the sustainer capacitor. This is still an obstacle for realizing a highly efficient discharge pumping circuit.

As being configured as previously described, the conventional laser oscillator circuit is disadvantageous in that (1) it has a slow voltage rise-up to be applied to a space between the main electrodes, and that (2) it can not apply a sufficient over-voltage with respect to the breakdown voltage of the slow rise-up D.C. voltage, and thus (3) it can not initiate a stable and uniform excitation discharge. It is another drawback inherent to the conventional circuitry that (4) the presence of the quiecsent period is sometimes unavoidable for the magnetic isolator, depending on an operational mode of the circuit, and thus the operational characteristics in the repetitive oscillation is sometimes saturated at a low repetition frequency.

The above-mentioned discharge pumping circuit, which isolates the discharge initiating energy from the injection of the pumping energy, has a technical advantage to such a laser gas, that has a short life in an upper lasing level and a low impedance at the discharge, as used in the Excimer Laser (in particular, the XeCl Laser) for performing a effective pumping. The circuit operation of the stated discharge pumping is intended to apply the sharp-rise pulse voltage to the space or gap between the two main electrodes. The directions of the discharging currents flowing from the spiker capacitor and the sustainer capacitor, respectively, are made identical with each other at a discharge region, by charging the sustainer capacitor in a polarity opposite to that for the spiker capacitor and by setting the switching revel of the magnetic isolator to $V_s$. By doing so, the realization of uniform pumping discharge is made easier.

The switching mode employed in the conventional circuitry differs from the operational mode of the present invention. In the conventional circuitry, the direction of the discharge current flown from the spiker capacitor is opposite to the direction of the discharge current flown from the sustainer capacitor at the discharge region. This conventional operational mode is detrimental to the apparatus in maintaining a stable discharge pumping.

In addition to this, the conventional switching mode is unable to apply a sharp rise-up pulse voltage across the first and second main electrodes at the time of breakdown, which would be realized by the present invention. If the sharp pulse voltage can be applied across the main electrodes, the breakdown voltage $V_b$ would increase depending upon the rate of the rise-up of the applied voltage and a more uniform excitation discharge could be obtained.

Incidentally, a simple application of a sharp rise-up pulse voltage to a space between the main electrodes is still not sufficient for realizing a uniform discharge required for the practical laser pumping. It is necessary to make the laser gas in a region wherein a laser pumping discharge is made in weakly ionized state (preionized state (electron density, $N_e = 10^6 - 10^8$ electron/cm$^3$)) in advance to the voltage application.

The timing for effecting the preionization before the voltage $V_g$ applied across the main electrodes reaches the breakdown voltage $V_b$ as well as the electron density in the region wherein the discharge is to take place are very important for the intended effective lasing and should be determined carefully. If it is not properly determined, a self-breakdown might be occurred and no laser radiation is obtained.

Although not disclosed in detail, nor explicitly, a schematic diagram of a circuitry of another example having a modified power source for charging the sustainer capacitor would be assumed as is shown in FIG. 30, which is assumed, still in the region of the conventional technology as disclosed in the same paper as cited previously (Applied Physics Letter, Vol. 48, No. 23, Jun. 9, 1986, pp. 1574–1576).

In this figure, numerals 31 and 32 designate a first and a second main electrodes arranged in a laser gas so that both faces with each other, a numeral 33 designates a spiker capacitor connected in parallel with a pair of the main electrodes 31 and 32, a numeral 34 designates a spiker charging power source capable of charging the spiker capacitor 33 quickly to a high voltage to trigger a discharge, a numeral 35 is a sustainer capacitor capable of injecting energy into the laser gas to be initiated between the main electrodes after the triggering of the discharge, a numeral 36 indicates a switching device such as a magnetic isolator, capable of electrically isolating the spiker capacitor 33 from the sustainer capacitor 35 for a given time period and a numeral 37 represents a sustainer charging power source capable of charging the sustainer capacitor 35 in a pulsative mode. The sustainer charging power source 37 includes a charging capacitor 38 for charging the sustainer capacitor 35, a high voltage switch 39 such as thyratron or the like which allows an energy transfer from the charging capacitor 38 to the sustainer capacitor 35 in a pulsative mode, and a charge time constant setting inductance 40 capable of setting the time constant for charging the sustainer capacitor 35. And a numeral 41 indicates a preionization source, such as X-ray radiation source, capable of preionizing the laser gas between the first and second main electrodes.

The operation of this circuit will be described with reference to a graph shown in FIG. 31, as follows. The graph represents a variation in the voltage $V_g$ to be applied across the first and the second main electrodes, developed with the time lapse.

When the high voltage switch 39 is turn on, the energy stored in the charging capacitor 38 is transferred to the sustainer capacitor 35 through the high voltage switch 39 and the charge time constant setting inductance 40, and further to the spiker capacitor 33 through the switching device 36 to increase the voltage across the main electrodes 31 and 32 (in period A of FIG. 31).

The voltage is however lower than the breakdown voltage $V_b$ to be applied to the pair of the main electrodes for initiating the discharge and thus no discharge is produced. If the spiker charging power source 34 is actuated in that state, a high voltage is developed across the spiker capacitor 33 and when the voltage across the main electrodes 31 and 32 exceeds $V_b$, and a discharge is induced (in period B of FIG. 31). When the discharge is induced, the voltage across the main electrodes 31 and 32 abruptly drops (in period C of FIG. 31).

Thereafter, the switching device 36 is made conductive to inject the energy stored in the sustainer capacitor 35 into the already induced discharge to allow it to pump the laser gas (in period D of FIG. 31) to emit a laser radiation. A mode, wherein the voltage polarity of the sustainer capacitor 35 is the same as that of the spiker capacitor 33, is called "magnetic diode mode".

It is observed that in order to obtain a larger laser energy, it is necessary to store a larger energy in the sustainer capacitor 35. But, the laser energy to be generated is limited by the breakdown voltage $V_b$ because the above-mentioned sustainer capacitor 35 is able to charge up to a voltage lower than the breakdown initiating voltage $V_b$.

Under a given gap distance d between the main electrodes 31 and 32, and under a given laser gas pressure p, the breakdown voltage $V_b$ across the main electrodes 31 and 32 is determined by a rise-up rate of the voltage across the main electrodes 31 and 32. In other words, it depends on the time constant Tc for charging the sustainer capacitor 35. Thus, the smaller the charging time constant Tc is, the higher the breakdown voltage $V_b$ can be made. Based on this relationship, it is found to be possible to store a larger energy in the sustainer capacitor 35 and to generate a larger laser energy, by shortening the charging time constant Tc.

The above-mentioned conventional example of the pulse laser discharge pumping circuit is designed to have a short charging time constant Tc in order to generate a large laser energy. The shortening of the charging time constant Tc for charging a larger energy in the sustainer capacitor 35 means an increase in the quantity of the energy which passes through the high voltage switch 39 for unit time period and thus the proportional increase in the stress on the high voltage switch 39. In the case of high repetition rate pulse laser for industrial use, in particular, the increased stress on the high voltage switch 39 is however disadvantageous in that it limits the charging voltage of the sustainer capacitor and the repetitive frequency to lower the performance and reliability of the laser, and in that it invites the deterioration of the high voltage switch 39 itself.

OBJECT AND SUMMARY OF THE INVENTION

The present invention has been made to overcome the above-mentioned disadvantages and to obviate the drawbacks inherent to the conventional circuitry, and has, as its object, the provision of a laser oscillation device of a high output, a high efficiency and a high reliability by realizing a stable, uniform repetitive excitation discharge.

It is another object of the present invention to provide a laser oscillator circuit which can be designed to have a small output fluctuation in a high repetitive rate operation.

It is a further object of the present invention to provide a laser oscillator circuit of excellent laser performance and of high reliability in a high laser energy level, by reducing the stress on the high voltage switch to prevent its deterioration.

According to the present invention, there is provided in the laser oscillator circuit including;

a laser housing having a laser gas, a first main electrode and a second main electrode both contained in the housing in positions where one faces the other, a spiker capacitor connected in parallel with the first and second main electrodes, a sustainer capacitor connected in parallel with the first and second main electrodes through a magnetic isolator, a spiker charging power source for charging the spiker capacitor, and a sustainer charging power source which charges the sustainer capacitor in a reverse polarity with respect to the manner of the first power source charging the spiker capacitor, a laser oscillator circuit characterized in that;

the magnetic isolator shifts from its OFF state to its ON state, during a process of charging the spiker capacitor by the spiker charging power source in a polarity reverse to that of the sustainer capacitor which has first been charged by the sustainer charging power source, before the terminal voltage of the spiker capacitor reaches a voltage which allows an initiation of discharge between the pair of the first and second main electrodes, in a manner that the shift causes an application of a sharp-rise pulse voltage across the first and second main electrodes by a transfer of electric charge from the sustainer capacitor to the spiker capacitor, to initiate the discharge between the first and second electrodes in a polarity opposite to that of the spiker charging power source.

In the above-mentioned laser oscillator circuit, said gas in the housing may be flown into and out of said housing as gas stream.

The capacitance of said sustainer capacitor may preferably be far greater than that of the spiker capacitor, the absolute value of the spiker charging voltage $|V_S|$ may preferably be not less than 0.6 times as high as that of the breakdown voltage $|V_b|$, and the stray inductance $L_s$ along the loop through which the discharge current of the sustainer capacitor is flown may preferably be far smaller than that $L_1$ along the loop through which the discharge current of the spiker capacitor is flown.

The magnetic isolator may preferably be configured to have a characteristics satisfying the formula:

$$(B_s+B_r)S < 1/2(V_{OPFN}-V_b)\Delta t_b$$

wherein;

$B_s$ is a saturation magnetic flux density, $B_r$ is a residual magnetic flux density, S is a core cross-sectional area of the magnetic substance in the magnetic isolator, $V_{OPFN}$ is a spiker charging voltage, $V_b$ is an inherent breakdown voltage, and $\Delta t_b$ is a time delay between the initiation of spiker reverse charging and the inherent breakdown of the laser.

Said circuit may preferably include a preionization source for preionizing the laser gas in a space between said first and second main electrodes and may preferably be of a repetitive operation having a repetition rate of at least three times for one second.

In addition to this, said preionization source may preferably be capable of initiating the preionization of said laser gas, after the initiation of charging said sustainer capacitor and before the initiation of charging said spiker capacitor by said first power source, and controlling said breakdown voltage across said first and second main electrodes developed by an application of a sharp-rise pulse, to be constant.

For the above-stated purpose, the time constant for charging said sustainer capacitor may preferably be in the range of 1–5 μs and the current for the preionization may preferably start to flow 100–500 ns before the initiation of the charging the spiker capacitor.

The above-mentioned laser oscillator circuit may further comprise, a means for controlling the operation timing of said preionization source in accordance with the frequency of said repetitive operation.

In addition to this, the laser oscillator circuit may preferably be of repetitive operation, and said second power source for charging said sustainer capacitor may preferably comprise at least one stage of a magnetic pulse compression circuit.

Further, the laser oscillator circuit may preferably comprise, a means for detecting the operation of said magnetic pulse compression circuit and for generating a detection signal, a trigger controlling circuit for generating a signal for triggering said first power source for charging said spiker capacitor in a predetermined delay after the generation of said detection signal, and a control means for adjusting the timing for charging said sustainer capacitor in response to the timing of charging said spiker capacitor.

According to another aspect of the present invention, there is provided, in the laser oscillator circuit including:

a laser housing having a laser gas, a first main electrode and a second main electrode both contained in the housing in positions where one faces the other, a spiker capacitor connected in parallel with the first and second main electrodes, a sustainer capacitor connected in parallel with the first and second main electrodes through a switching device, a first power source for charging the spiker capacitor, a second power source for charging the sustainer capacitor, and a preionization source for preionizing the laser gas in a space between the first and second main electrodes;

a laser oscillator circuit characterized in that;

the second power source for charging the sustainer capacitor comprises at least one stage of a magnetic pulse compression circuit unit.

In the above-mentioned aspect of the present invention, the polarity of charging the sustainer capacitor may be identical with that of charging the spiker capacitor. Said gas in the housing may be flown into and out of said housing as gas stream. And the stated laser oscillator circuit may further comprise, a means for detecting the operation of said magnetic pulse compression circuit and for generating a detection signal, a trigger controlling circuit for generating a signal for triggering said first power source for charging said spiker capacitor in a predetermined delay after the generation of said detection signal, and a control means for adjusting the timing for charging said sustainer capacitor in response to the timing of charging said spiker capacitor.

In the above-mentioned laser oscillator circuit built in accordance with the present invention, the charging of the spiker capacitor is quickly changed-over to an opposite polarity by the switching operation of the magnetic isolator interposed in a circuit which connects the sustainer capacitor with the main electrodes, and a voltage of very rapid rise-up is applied across the main electrodes. In addition to this, by connecting the preionizer in parallel with the spiker capacitor, the electron density produced by the preionization in the laser housing can easily be made greater in a simple structure.

The laser oscillator apparatus having the preionizer may be designed to only perform said preionization in a given delay time after the initiation of charging to the sustainer capacitor. Thus, the longer the delay time is, the higher becomes the initiating voltage for the self-breakdown in the repetitive operation. In other words, it can store much more laser pumping energy in the sustainer capacitor. In addition to this, since it may be designed to initiate the preionization before the initiation of the charging the spiker capacitor in the opposite polarity, the time up to the triggering of the discharge can be made shorter, and it can start the discharge at a given voltage before the voltage across the main electrodes reaches the first peak voltage $V_{P1}$, which will be discussed on FIG. 9 of the embodiment.

Thus, the present invention has an advantage in that it can provide a laser oscillator circuit of high output, a high stability, and of a good repetitive performance.

The discharge-pumped pulse laser oscillator of the present invention, which has the magnetic pulse compression circuit connected across the charging capacitor and the sustainer capacitor, has such advantages that it can reduce the stress on the high voltage switch and shorten the time constant for charging the sustainer capacitor, and that it can realize a laser apparatus of a high performance, a long service life and a high reliability.

In addition to this, by providing a detection means for detecting the operation of the magnetic pulse compression circuit and the delayed trigger generator, the laser oscillator can accurately set the timing for charging the sustainer capacitor so that it may conform to the timing for charging the spiker capacitor. Thus it is advantageous in that it can greatly reduce the laser output fluctuation.

While the novel features of the present invention are set fourth particularly in the appended claims, the invention, both as to organization and content, will be better understood and appreciated, along with the other objects and features thereof, from the following detailed description taken in conjunction with the appended drawings.

BRIEF DESCRIPTION OF THE DRAWINGS

FIG. 17 is a schematic circuit diagram of another embodiment with a two stage magnetic pulse compression circuit built in accordance with the present invention.

DESCRIPTION OF THE PREFERRED EMBODIMENT

In the following paragraphs, the present invention will be described in more detail, with reference to the preferred embodiment thereof shown in the appended drawings FIG. 1 through FIG. 24.

EXAMPLE 1

Figure 1:
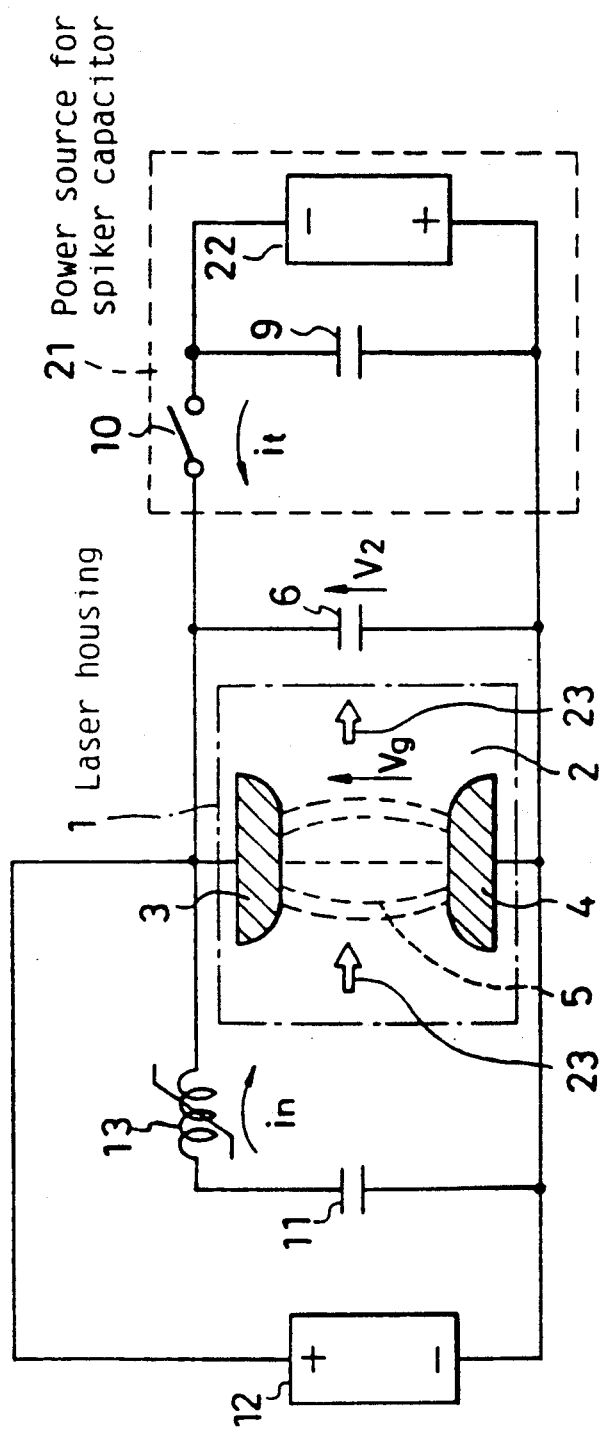
FIG. 1 is a schematic circuit diagram of an embodiment built in accordance with the present invention.
Figure 2A:
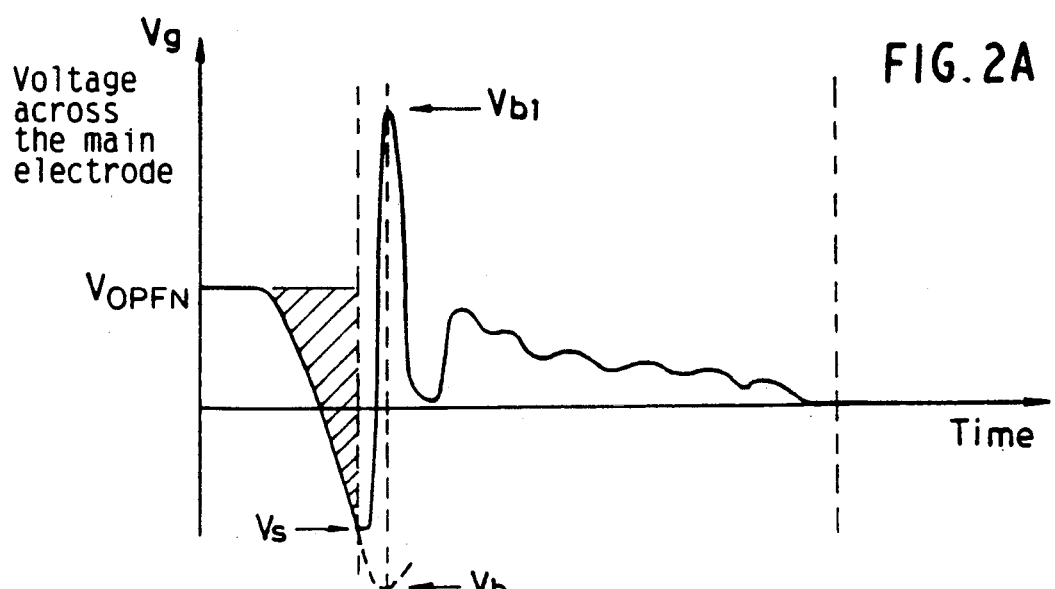
FIGS. 2A–2C are waveform diagrams illustrating the operation of the circuit shown in FIG. 1.
Figure 2B:
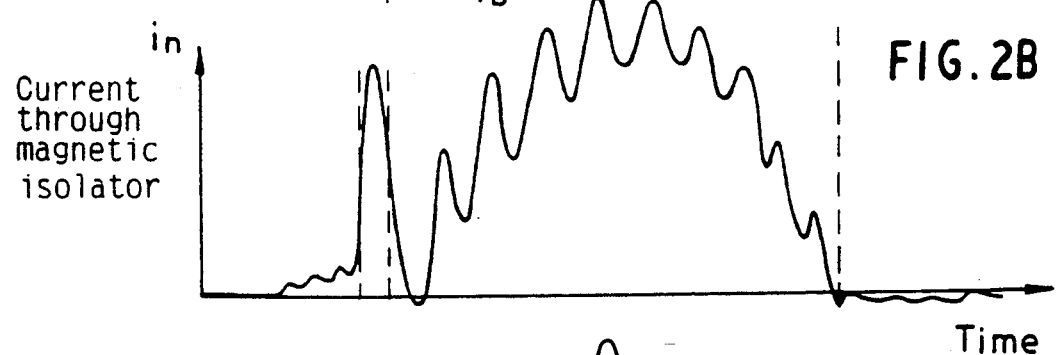
Figure 2C:
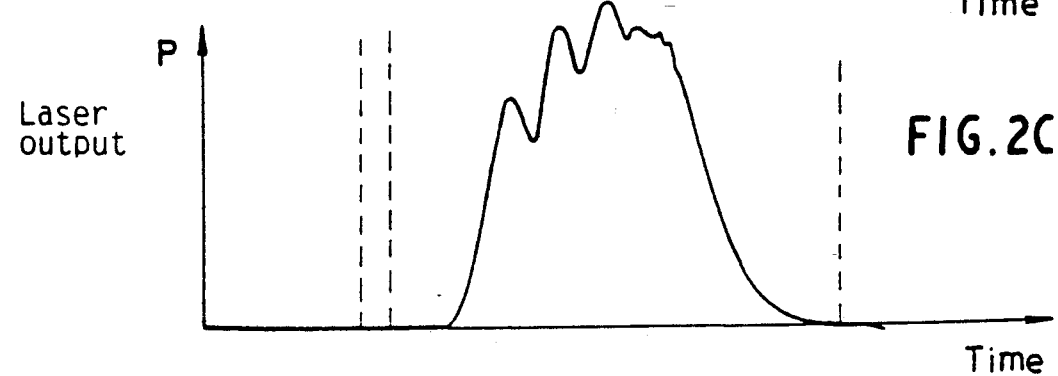
Figure 28:
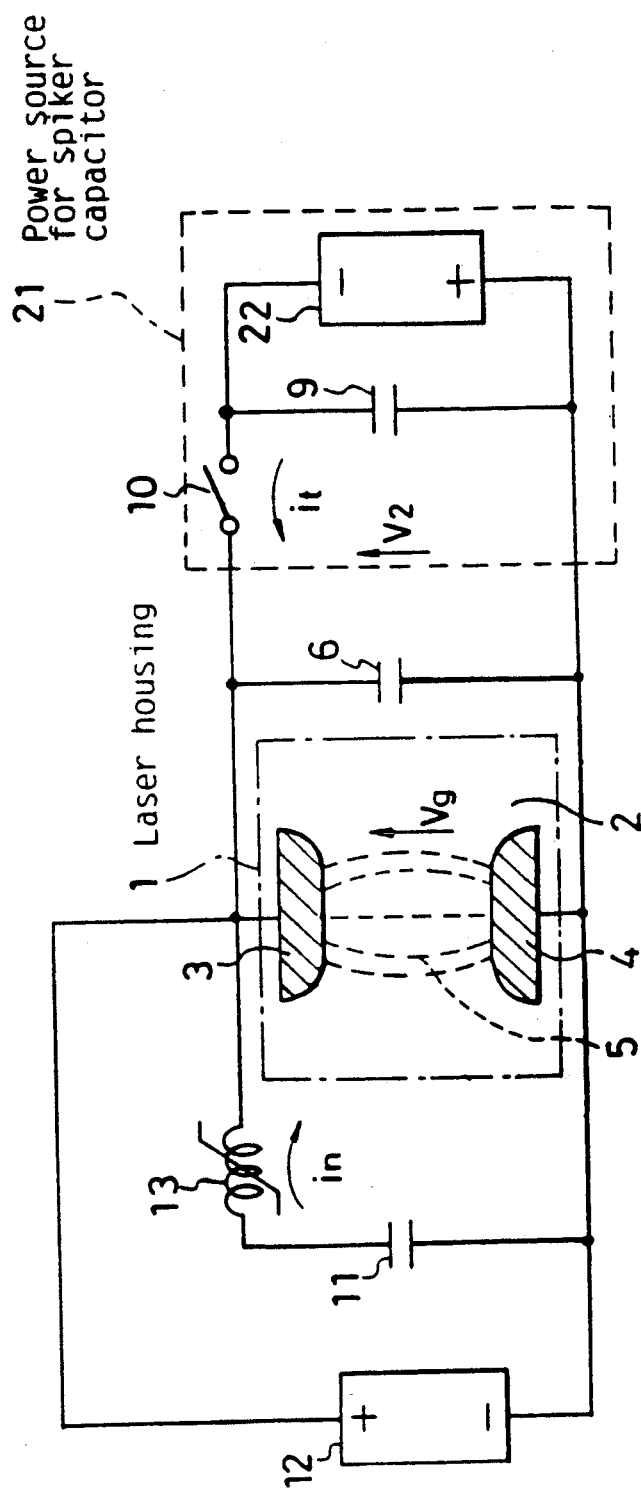
FIG. 28 is a schematic circuit diagram of another example of the conventional discharge-pumping laser device.
Figure 29A:
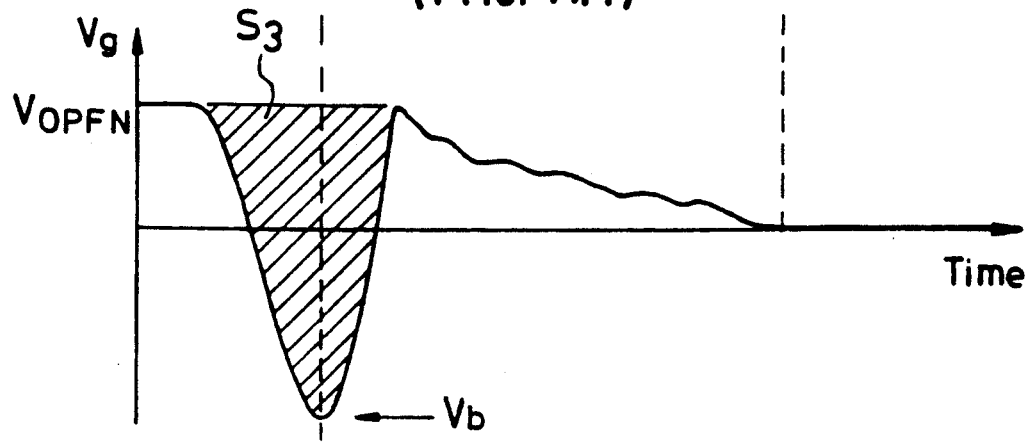
FIGS. 29A-29C are waveform diagrams illustrating the operation of the circuit shown in FIG. 28.
Figure 29B:
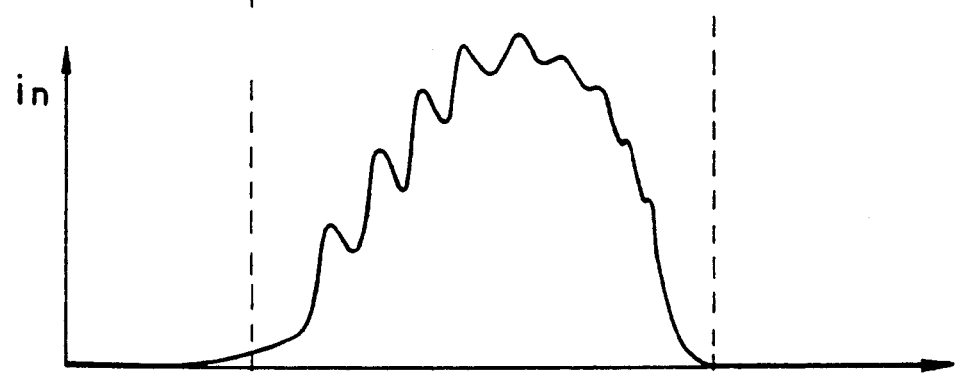
Figure 29C:
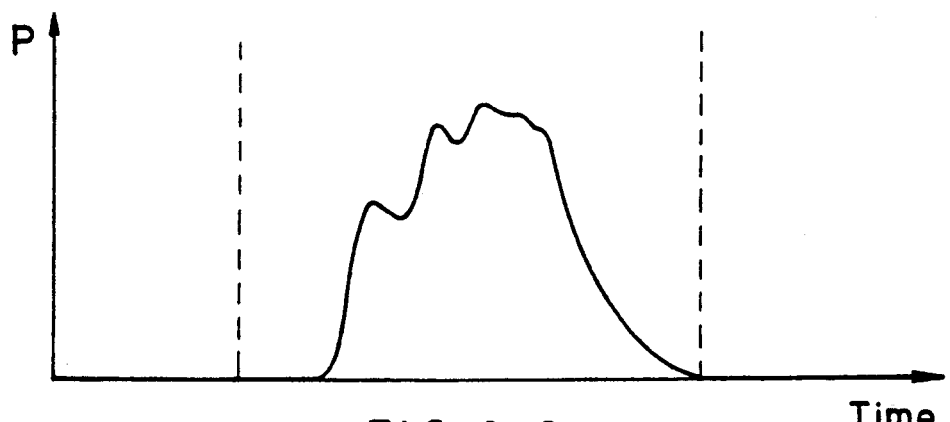

The circuitry of FIG. 1 is quite similar to that of the conventional switching mode shown in FIG. 28, and the same reference numerals and symbols are used for designating the equivalent parts and components. An additional numeral 23 indicates the direction of the laser gas stream. It however differs therefrom at least in an operational characteristics of the magnetic isolator 13. The operational characteristics of the apparatus shown in FIG. 1 are illustrated by referring to the waveform diagrams shown in FIG. 2.

In the following paragraphs, the operation of the circuitry built in accordance with this embodiment will be described. First, the sustainer capacitor 11 has been charged to a predetermined charging voltage $V_{OPFN}$, by the sustainer charging power source 12. Then, the spiker capacitor 6 is charged by the spiker reverse-charging power source 21. In this case, the polarity of the voltage $V_g$ to be applied to the region between the main electrodes 3 and 4 is in the negative as shown in the waveform diagram (a) of FIG. 2. If this charged state is maintained, the voltage $V_g$ continues to increase in the negative direction as indicated by a dotted curve in the waveform diagram (a) of FIG. 2 and if it were to reach the hypothetical breakdown voltage $V_b$, the excitation discharge 5 should have been initiated. In this preferred embodiment of the present invention, however, the magnetic isolator 13 is designed to be turned to its ON state at a time point (switching point) when the voltage $V_g$ reaches $V_s$ which is sufficiently smaller than and is to be reached sufficiently prior to the voltage $V_b$. At that time, the charge stored in the sustainer capacitor 11 is flown into the spiker capacitor 6 at a breath and the spiker capacitor 6 is quickly charged in the same polarity as that of the sustainer capacitor 11. Thereafter, at a time point when the voltage reaches $V_{b1}$ which has a greater absolute value than the breakdown voltage $V_b$ in the negative direction, a uniform excitation discharge 5 is initiated. At that time, the charge stored in the sustainer capacitor 11 is flown into the main discharging region to perform a laser oscillation.

Figure 7:
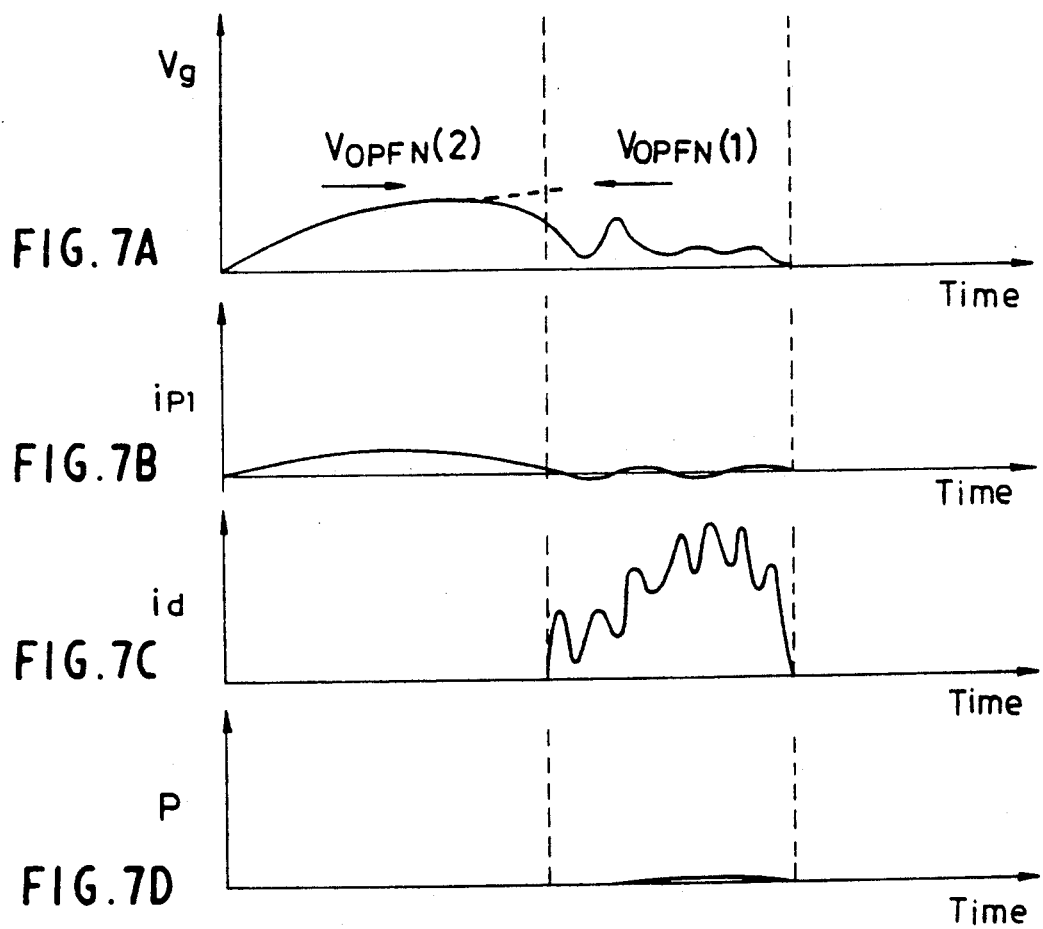
FIGS. 7A-7D are waveform diagrams illustrating the operation of the circuit shown in FIG. 6.

Incidentally, the rise-up of the voltage, in the process of charging the spiker capacitor 6 in the ON state of the magnetic isolator 13, is illustrated with reference to an equivalent circuit shown in FIG. 7. In this case, the line resistance $R_s$ in the loop through which the current $i_n$ flown is neglected to be ignored as being sufficiently small. For a similar reason, the influence of the spiker reverse-charging power source 21 is also ignored. In addition to this, a hypothesis, $c_1 \gg c_2$, which is generally accepted in a spiker/sustainer circuit system, is established.

Under the above-mentioned conditions, the average rate of voltage rise-up until the spiker capacitor reaches its peak voltage in the circuit is represented by the following formula:

$$(dV_2/dt)_{ave} \approx (1/\pi) \times (2V_{OPFN} - V_s) \times (L_s \times c_2)^{-\frac{1}{2}} \qquad (3).$$

By substituting the variables in the above formula by the following typical values:
$V_{OPFN} = 10$ kV,
$V_s = -20$ kV,
$L_s = 40$ nH, and
$c_2 = 6$ nF;
the rate of $(dV_2/dt)_{ave} \approx 820$ kV/µs is derived.

This value is approximately twice as much as that is obtained by the same formula with the conventional circuitry of the switching mode.

The major reason for the rapid voltage rise-up is that the $L_s$ is limited to be smaller than $L_1$ in its structure as appreciated by comparing the formula (3) with the formula (2). As a result, a voltage of rapid rise-up is applied to the region between the main electrodes 3 and 4, and a more stable and uniform excitation discharge is obtained. In addition to this, a laser oscillating output being a higher output and a higher efficiency as well as a good reproducibility is obtained for the same quantity of the charged energy.

In the following paragraphs, the experimental results which prove the superiority of this mode (hereinafter, will be referred to as "reversed voltage mode") to the other modes (diode mode) will be described.

Figure 3:
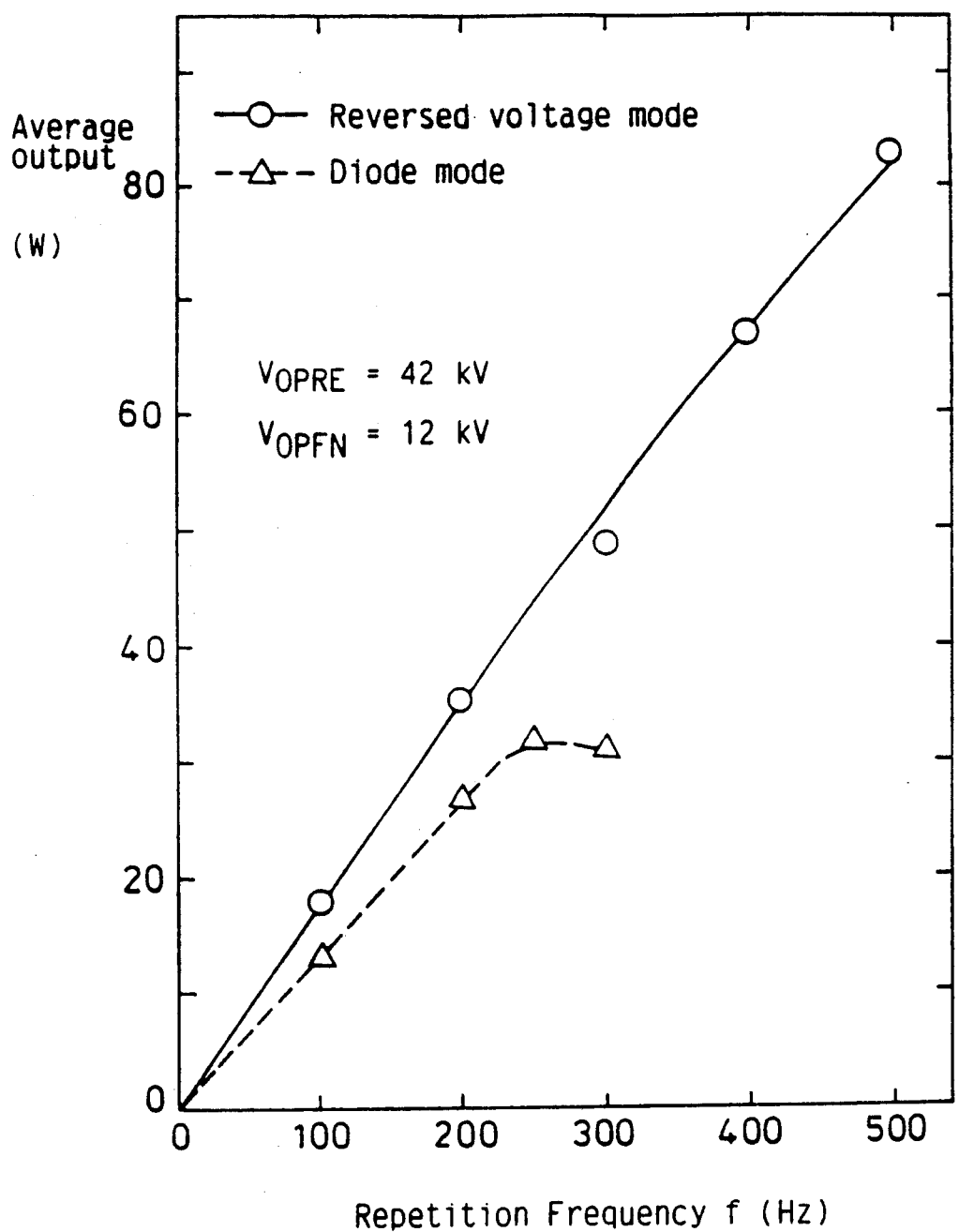
FIG. 3 is a graph showing a repetitive oscillation characteristics of the circuit shown in FIG. 1.

A graph shown in FIG. 3 summarizes the output characteristics at the repetitive oscillation under the same operational conditions in both the diode mode and the reversed voltage mode. As can be appreciated from this graph, the output in the diode mode starts to decline when the repetition rate exceeds 300 Hz, as has been elucidated also in the above-mentioned description of the prior arts, whereas a substantially linear increase in the output up to 500 Hz is observed with regard to the reversed voltage mode. The cause of this difference is considered to be based on the difference in the uniformities of the spiker discharges and in the presence of the quiescent period in the excitation current supplied from the sustainer capacitor, and mainly due to the difference in the rise-up rates of the voltages applied at the time of initiating the spiker discharge.

Figure 4:
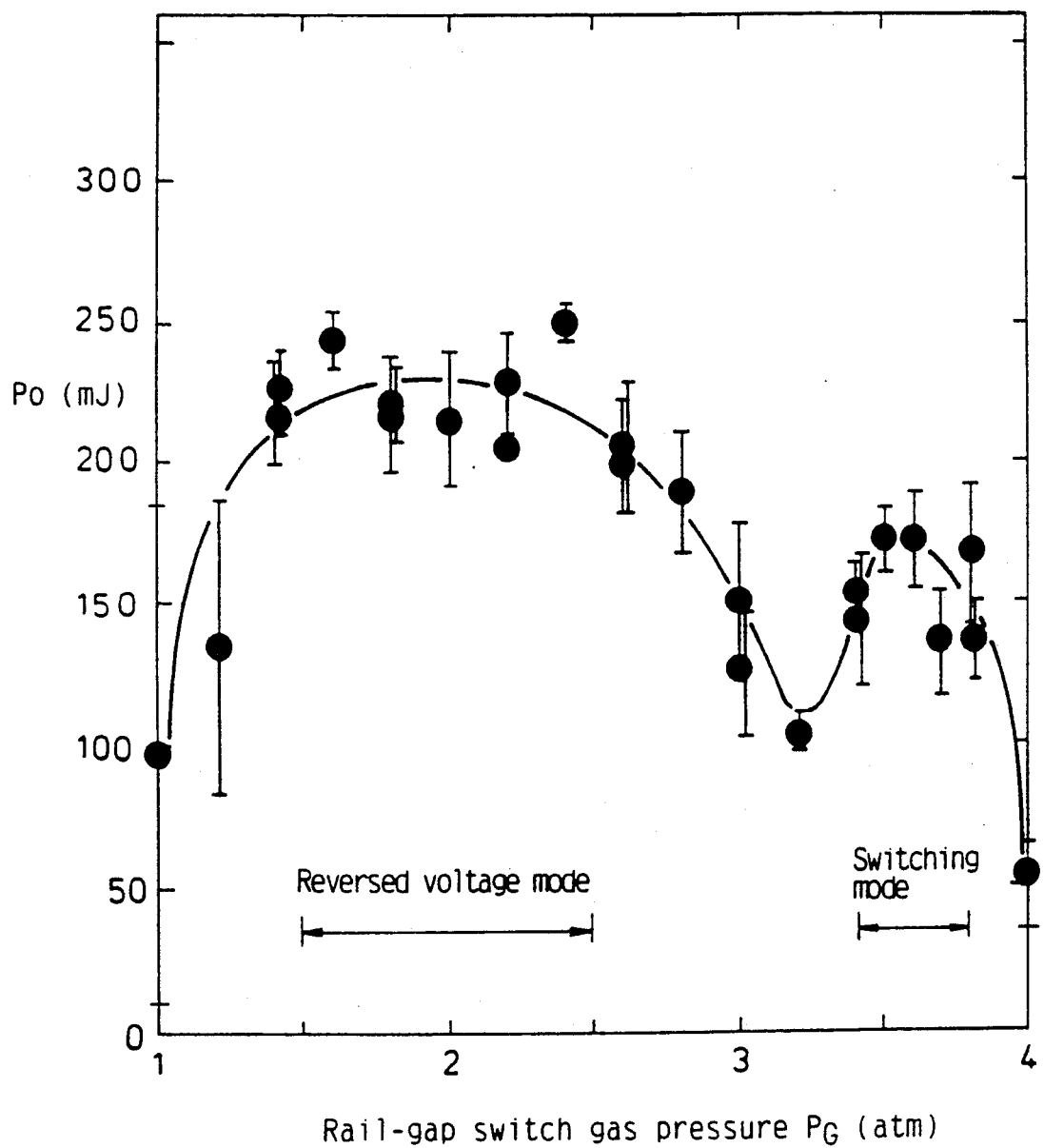
FIG. 4 is a graph showing a laser gas pressure-dependency of a laser device which uses rail-gap switch.

A graph shown in FIG. 4 summarizes a result of the experiment. In FIG. 4, there is shown the output characteristics of a circuitry employing a rail-gap switch in place of the magnetic isolator in a single pulse operation. In the case of rail-gap switch, it is possible to easily select any of the switching mode and the reversed voltage mode only by adjusting the pressure of the working gas. As appreciated from the graph, an output increase of about 20% is realized with the reversed voltage mode as compared with that with the switching mode. The cause of this difference is considered to be based on the difference in the uniformities of the spiker discharges, mainly due to the differences in the rise-up speeds of the voltages applied at the time of the initiation of the spiker discharge. Another possible cause is considered to be based on the fact that a more effective spiker discharge is realized in the reversed voltage mode. This is because, in the switching mode, the direction of the current supplied from the spiker capacitor is reversed with respect to that from the sustainer capacitor, whereas both are in the same direction in the reversed voltage mode.

Further, as will be appreciated from the afore-mentioned formula (3), the charged voltage $V_s$ of the spiker capacitor 6 immediately before the switching of the magnetic isolator 13 should preferably have a large absolute value, for the purpose of improving the rise-up of the voltage across the main electrodes. And the charged voltage $V_s$ at that moment should be of the value:

$$|V_s| \geq 0.6 \times |V_b|,$$

for performing a stable operation.

Moreover, the polarities of the sustainer charging power source 12 and the spiker reverse polarity charging power source 21 are shown only exemplary in the circuit diagram of FIG. 1, and they may be of opposite polarity with each other.

Figure 5:
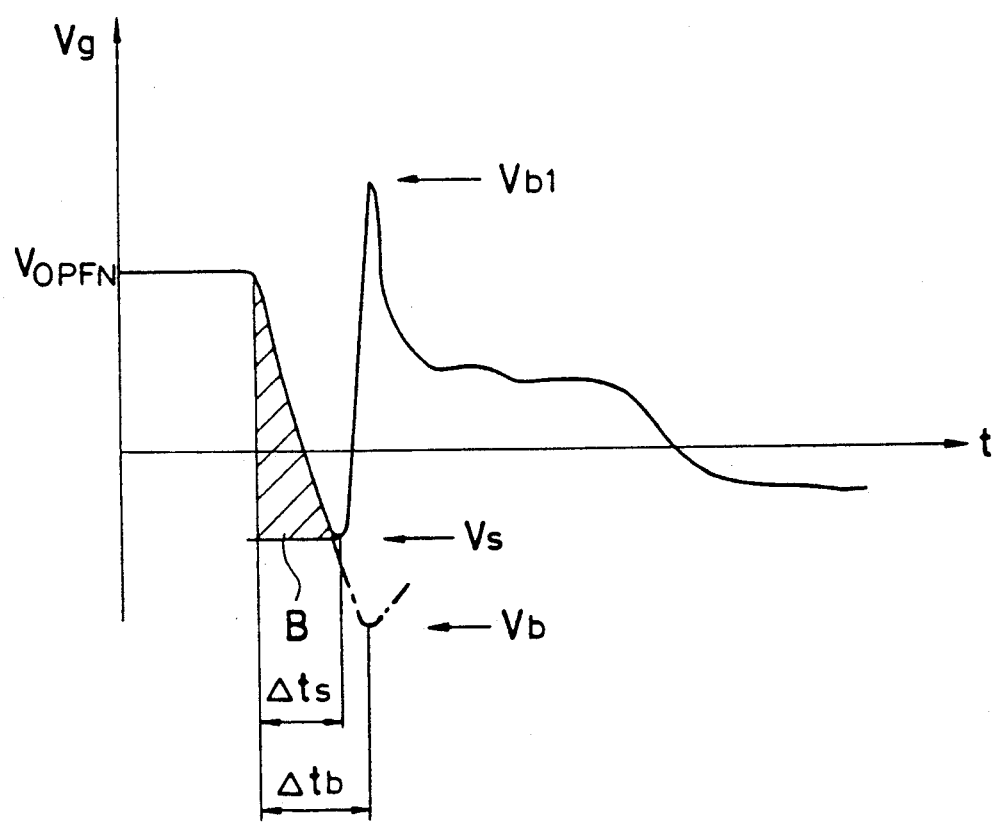
FIG. 5 is a waveform diagram showing an operational characteristics of the magnetic isolator used in the embodiment shown in FIG. 1.

FIG. 5 is a waveform diagram showing a time dependency of the voltage $V_g$ applied across the main electrodes 3 and 4 in the case of using the magnetic isolator 13. In the initial stage, the spiker capacitor 6 is also charged up to $V_{OPFN}$ by the sustainer charging power source 12. It is possible, even in this state, to charge the spiker capacitor by the spiker reverse charging power source 21 in the negative direction. The magnetic isolator 13 is designed so that it saturates at a time point when the voltage $V_g$ reaches $V_S$ for the hypothetical breakdown voltage $V_b$ in the negative direction. In other words, a saturation magnetic flux density $B_S$, a residual magnetic flux density $B_r$ and a core cross-sectional area S of the magnetic substance in the magnetic isolator are selected so that the magnetic flux of the magnetic substance in the magnetic isolator saturates at a time point when it reaches an integrated value B represented by the hatched area.

Namely, when a time period $\Delta t_s$ is taken as the period from the initiation of the spiker reverse charging power source 21 to a time point when the voltage of the power source reaches $V_S$, the hatched area B is represented by the formula;

$$(B_S+B_r)S = 1/2(V_{OPFN}-V_b)\Delta t_S$$

which is smaller than the area of a similar triangle with an extended base $\Delta t_s$ which would be required up to a time point when the voltage should have reached the hypothetical breakdown voltage $V_b$, namely;

$$(B_S+B_r)S = 1/2(V_{OPFN}-V_b)\Delta t_b.$$

Therefore, the magnetic isolator should be such device that satisfies the following relationship;

$$(B_S+B_r)S < 1/2(V_{OPFN}-V_b)\Delta t_b$$

EXAMPLE 2

Figure 6:
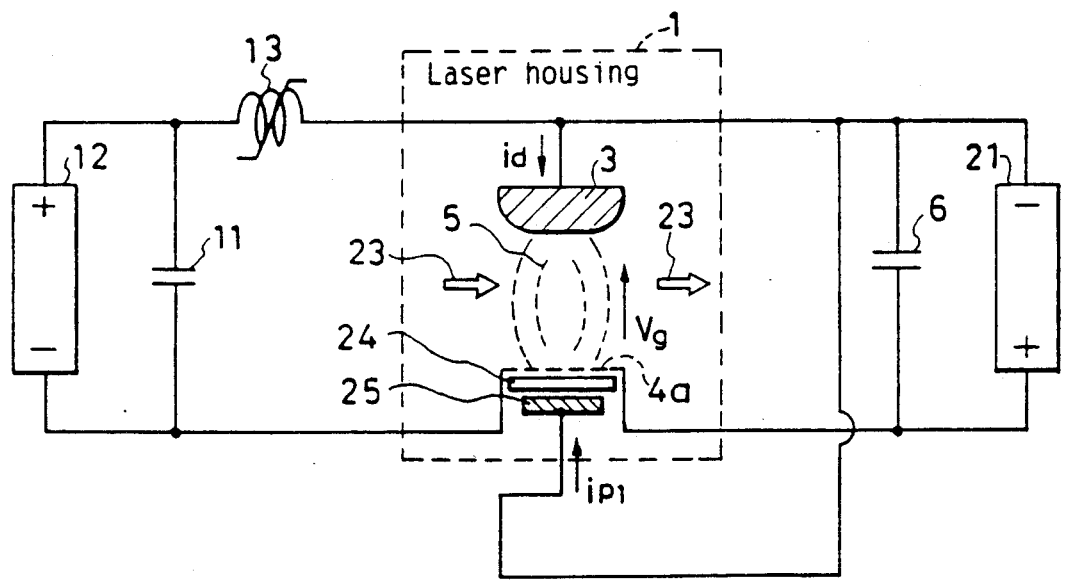
FIG. 6 is a schematic circuit diagram of another embodiment with a preionizing system built in accordance with the present invention.

A schematic circuit diagram of an embodiment, which combines the circuit operation as described with reference to FIGS. 1-5, with a corona preionization system, is shown in FIG. 6. In this figure, a second main electrode 4 is replaced by another second main electrode 4a, having a multiplicity of pores, and a dielectric material body 24 as well as an auxiliary electrode 25 are provided behind the second main electrode 4a (multipore electrode). The auxiliary electrode 25 is electrically connected to a terminal of the spiker capacitor 6 to form an automatic preionization system.

In the circuitry shown in FIG. 6, the sustainer capacitor 11 has previously been charged by the sustainer charging power source 12 as in the case of EXAMPLE 1. Since the second main electrodes 4a and the auxiliary electrode 25 are connected in parallel with the spiker capacitor 6, a sharp rise-up pulse voltage, which is to be applied to the main electrodes 3 and 4a, is also applied across the second main electrode 4a and the auxiliary electrode 25, to develop a corona discharge with a large current value on the openings of the second main electrode 4a and on the surface of the dielectric body 24. The laser gas in the region wherein the excitation discharge takes place is uniformly preionized by the ultraviolet ray attributable to this corona discharge. The subsequent operation performed with this circuit is identical to that has been described with reference to FIG. 1. In this embodiment, when a sharp rise-up pulse voltage is applied to the space between the main electrodes 3 and 4a, an electron multiplying takes place making each of the uniformly scattered electrons as nucleus to surely obtain a uniform excitation discharge 5 by virtue of the "preionization effect".

This embodiment is advantageous in its relatively simple structure with the preionization system of a high reliability, and in the small deteriorating effect such as a dissociation of the contained laser gas because the corona discharge preionizes the gas, as far as it is used as a device for single laser radiation.

In the case of the "repetitive operation", which is defined by repetitive-pulse discharge in a rate of three times per second or more is performed and the charging voltage $V_{OPFN}$ of the sustainer capacitor 11 is relatively high, a somewhat different circuit operation is performed. The circuit operation in such the repetitive-pulse discharge case is summarized in waveform diagrams shown in FIG. 7, wherein time chart (a) indicates a voltage $V_g$ across the first and the second main electrodes, time chart (b) indicates a current for the preionization $i_{PI}$ flowing through the auxiliary electrode 25 and the second main electrode 4a, time chart (c) represents a discharge current $i_d$ flowing through the first and the second main electrodes, and time chart (d) indicates a laser output power P.

The operation of the circuit shown in FIG. 6 will be described below. In the case of repetitive discharge, it is necessary to allow the laser gas stream 23 to remove or evacuate any discharge products such as ions, electrode spattering product and the like, remaining in the region wherein the excitation discharge 5 takes place as a residue of the previous discharge, from such region, prior to occurrence of the subsequent discharge.

The complete removal of such products from the surface of the electrode is, however, unable to be performed, because the laser gas stream is hardly movable around such surface. Based on this phenomenon, when the charging voltage $V_{OPFN}$ is relatively high and thus the preionizing current $i_I$ flows constantly during the charging process, a self-breakdown takes place across the main electrodes 3 and 4a, at $V_{OPFN}(2)$ being lower than $V_{OPFN}(1)$. Since this discharge is such a discharge that takes place before the application of the sharp rise-up pulse voltage from the spiker capacitor 6, it does not diffuse uniformly but becomes several arc discharges which take place respectively at several points of the surfaces of the main electrodes 3 and 4a. Thus no laser output is obtained.

EXAMPLE 3

Figure 8:
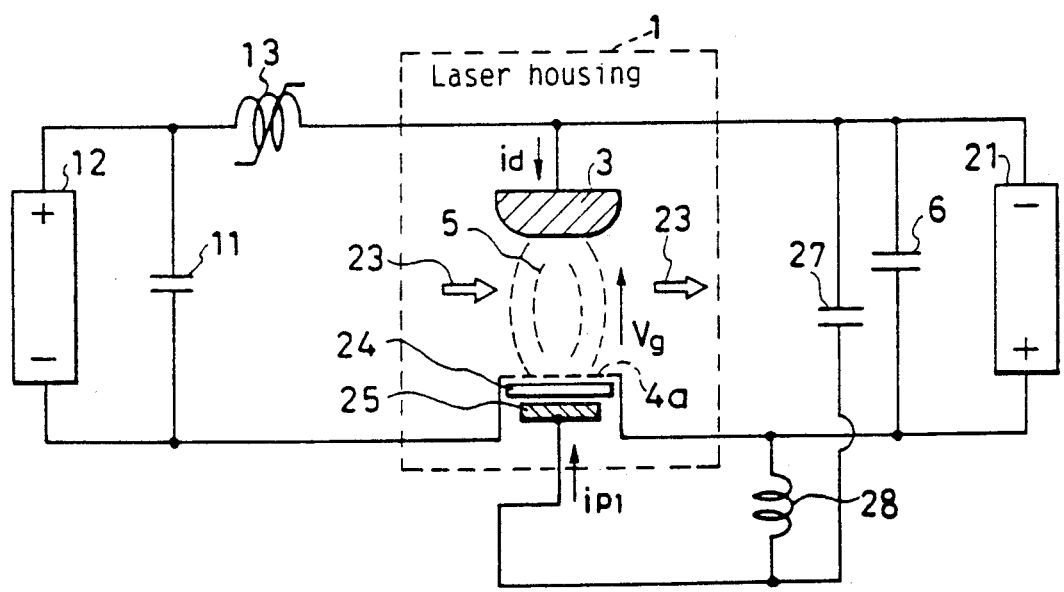
FIG. 8 is a schematic circuit diagram of another embodiment with another preionizing system built in accordance with the present invention.

FIG. 8 shows a schematic diagram of a circuitry which was found to be effective for suppressing the self-breakdown during the charging process. In this figure, a numeral 27 designates a preionization capacitor and a numeral 28 designates an inductive element for by-passing preionization current (preionization inductance). In this circuitry, the inductance 28 is substantially short-circuited across its terminals during the process of charging the sustainer capacitor 11. Thus, the major portion of its charging voltage is happened to be applied to the preionization capacitor 27. As a result, no voltage will be applied to a space between the second main electrode 4a and the auxiliary electrode 25, and thus no preionization will be performed during the process of charging the sustainer capacitor 11. By configuring so, the self-breakdown becomes hardly happened even in the repetitive discharge. In this circuitry, the current for the preionization $i_{PI}$ is designed to start to flow, only after the initiation of the charging of the spiker capacitor 6 by the spiker charging power source 21 in the opposite polarity. The reason for this phenomenon is that the time constant for the spiker capacitor 6 to be charged in the opposite polarity is short and thus a voltage is induced across the both ends of the preionization inductance 28.

Figure 9:
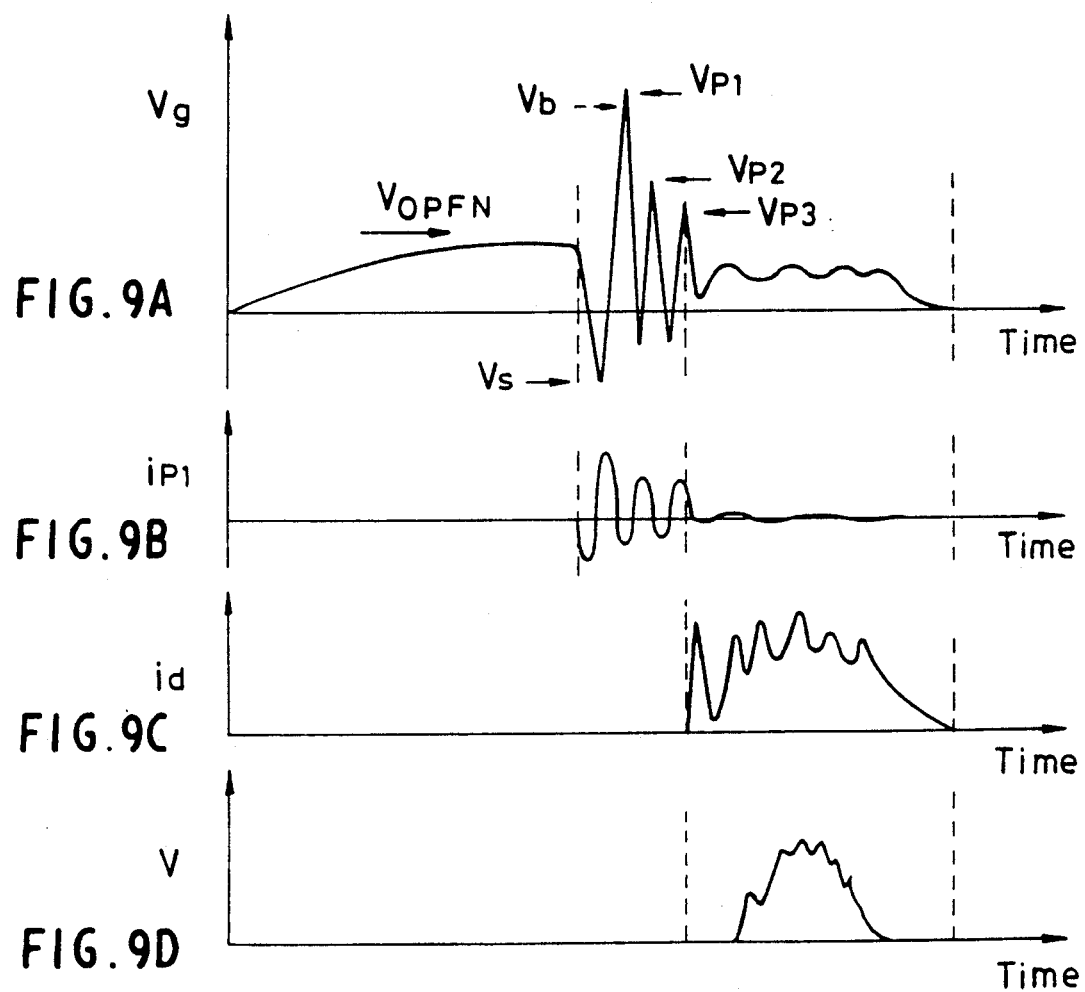
FIGS. 9A-9D are waveform diagrams illustrating the operation of the circuit shown in FIG. 8.

The circuit operation of the circuitry shown in FIG. 8 as well as its oscillation output are summarized in the waveform diagrams shown in FIG. 9, wherein time chart (a) indicates the voltage $V_g$ across the main electrodes 3 and 4a, time chart (b) indicates the preionization current $i_{PI}$, time chart (c) indicates the main discharging current $i_d$, and time chart (d) indicates the laser output power P.

This circuitry has brought such a great advantage in the suppression of the self-breakdown during the process of charging the sustainer capacitor under the conditions of the repetitive operation. It was however found that the period from the initiation of charging the spiker capacitor 6 in the opposite polarity up to the time when the voltage $V_g$ reaches the switching voltage $V_s$ for the magnetic isolator 13 and further reaches the peak voltage $V_{P1}$ of the voltage of the opposite polarity is very short, e.g. in the order of 50–100 ns. Therefore the preionization was sometimes performed only insufficiently, and thus it was not possible to perform the intended discharge at a voltage $V_{b1}$ at which the discharge should inherently have made in.

Under the circumstance, an oscillating voltage is applied across the main electrodes 3 and 4a, and a discharge can only be initiated in a vicinity of the subsequent peak voltages $V_{P2}$, $V_{P3}$ (or $V_{Pn}$, $n \geq 4$) in the first instance. In such case, since the actual breakdown voltage is lower than the inherent breakdown voltage $V_{b1}$, a sufficiently uniform excitation discharge 5 may sometimes be failed to be obtained, and the discharge will become an arc discharge of non-uniform discharging state during the process of flowing the discharge current $i_d$, and eventually the laser output will be stopped.

EXAMPLE 4

As above-stated, the circuitry shown in EXAMPLE 3 discussed with reference to FIG. 8 was found to be unsatisfactory in some instances. Namely, both the laser output and the oscillating efficiency are sometimes suppressed to low levels. In addition to this, an undesirable variation is inevitable among the initiating voltages for the respective discharge occurrences in this circuitry, to invite a large output fluctuation in the repetitive operation.

Thus, the previously described embodiments with a system for effecting preionization are still unsatisfactory. One of the disadvantages is the restriction imposed on the high output design of the laser attributable to the self-breakdown during the process of charging the sustainer capacitor in the repetitive operation. Another disadvantage is the unstable breakdown voltage induced by the application of the sharp-rise pulse voltage across the main electrodes, to invite a lowering of the laser output and its efficiency, as well as an increase in the undesirable laser output fluctuation.

Figure 10:
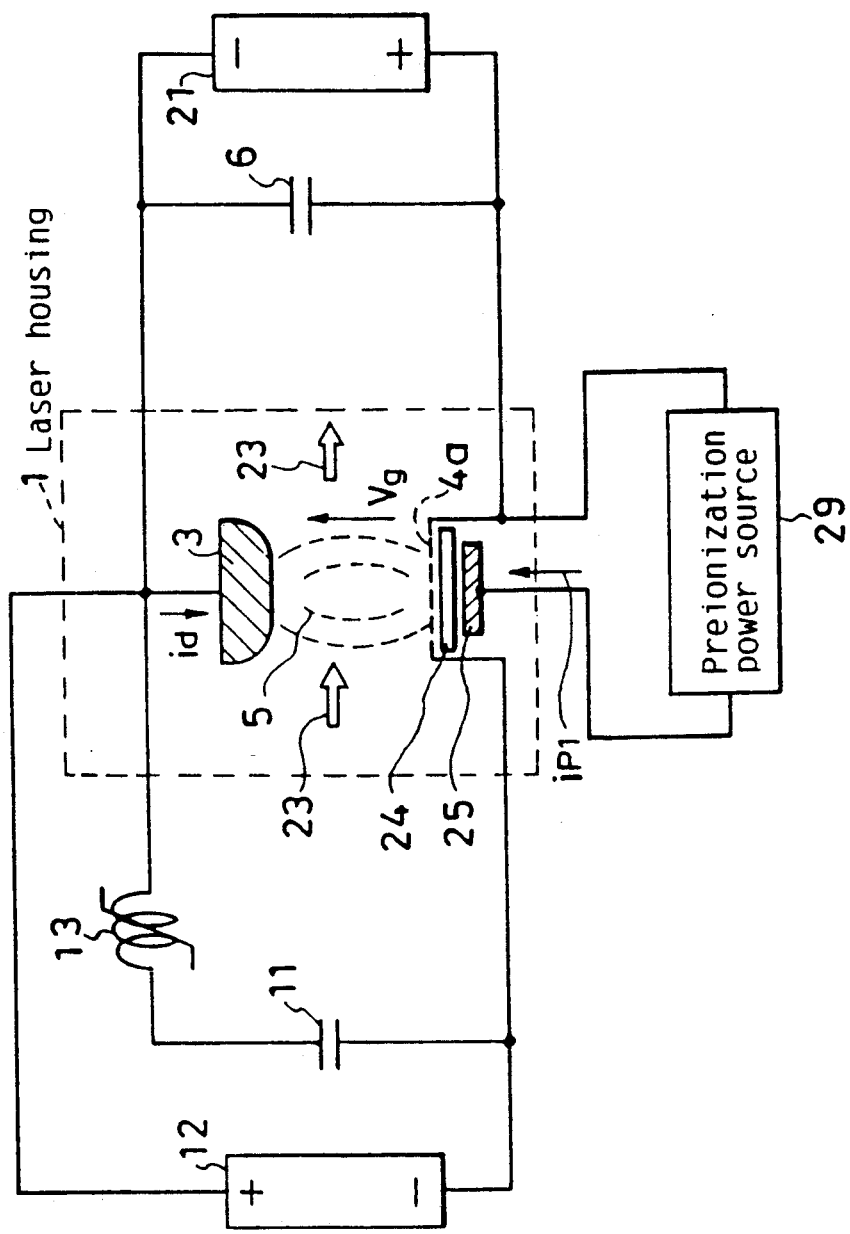
FIG. 10 is a schematic circuit diagram of another embodiment with a further preionizing system built in accordance with the present invention.

In the circuitry shown in FIG. 10, which illustrates another embodiment built in accordance with the present invention, a separate preionization power source 29 is provided in order to improve the operation of the previous embodiments.

Figure 11:
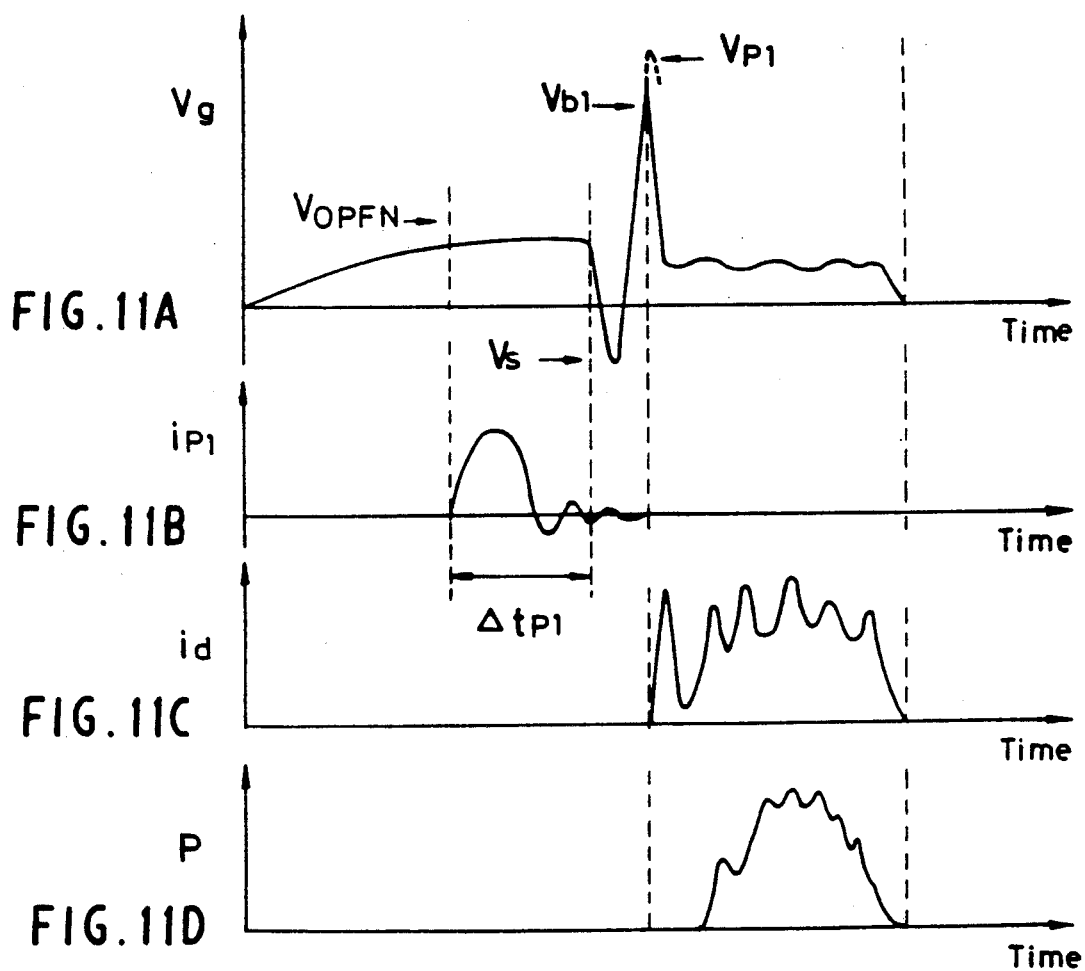
FIGS. 11A-11D are waveform diagrams illustrating the operation of the circuit shown in FIG. 10.
Figure 12:
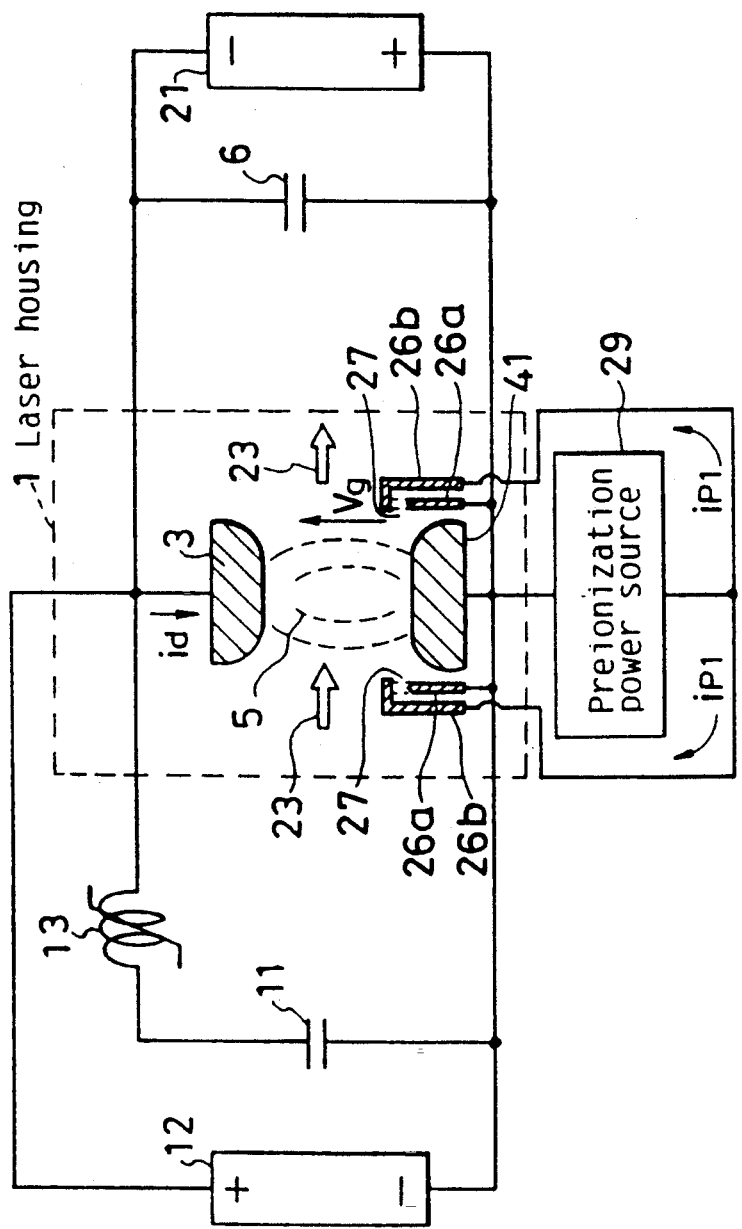
FIGS. 12, 13 and 14, each is a schematic circuit diagram of another embodiment with modified preionizing system built in accordance with the present invention.

The waveform diagrams shown in FIG. 11 illustrate the operation of the embodiment, wherein time chart (a) designates the voltage $V_g$ across the main electrodes 2 and 3a, time chart (b) designates the current $i_{PI}$ for preliminary ionization, time chart (c) designates the discharge current $i_d$, and time chart (d) designates the laser output P.

The fundamental configuration as well as its operation of the circuit shown in FIG. 10 are the same as those illustrated with reference to the circuits and operations shown in FIGS. 6 through 9, respectively, except that the separate power source 29 is provided for the preionization.

In this case however, at a time point when the voltage $V_g$ between the main electrodes 3 and 4a sufficiently risen-up after the charging of the sustainer capacitor 11 by the sustainer charging power source 11, the power source 29 for preionization is actuated to apply a voltage across the second main electrode 4a and an auxiliary electrode 25. Then, a preionization current $i_{PI}$ starts to flow upon the voltage application, to induce a corona discharge between the openings in the main electrode 4a and along the surface of a dielectric material body 24. By this "surface corona discharge", the laser gas in lasing zone, wherein the excitation discharge 5 takes place, becomes a weakly ionized state. In a stage wherein the preionization develops up to a substantial degree, the voltage $V_g$ between the main electrodes 3 and 4a reaches $V_{OPFN}$ which equals to the predetermined charging voltage of the sustainer capacitor 11. At this time point, the spiker charging power source 8 is actuated to start its charging of the spiker capacitor 6 in a reverse polarity. When the voltage $V_g$ reaches $V_s$ which has a polarity opposite to $V_{OPFN}$, the magnetic isolator 13 is actuated to permit a quick charge transfer from the sustainer capacitor 11 to the spiker capacitor 6. By this charge transfer, a rapid pulse voltage is applied to the space between the main electrodes 3 and 4a to surely initiate a discharge at a voltage $V_{b1}$ near to the first peak voltage $V_{P1}$. This is because the contained gas has already started its preliminary ionization during the process of charging the sustainer capacitor 11 and a phenomenon of electron multiplying with certain degree of spatial uniformity has already been developed up to this charging voltage. The excitation discharge 5 at that time is a uniform and stable one and able to realize an efficient laser oscillation, because the discharge is initiated under a uniform preionization and a sufficient over-voltage. Besides, since the preliminary ionization is made at a stage wherein the charging voltage of the sustainer capacitor 11 comes close to a predetermined voltage $V_{OPFN}$, a voltage having liability of self-breakdown can be maintained to a high voltage in certain degree, even in the repetitive operation.

Incidentally, a time period between the initiation of flowing the current $i_{PI}$ for the preionization and the initiation of charging the spiker capacitor 6 in the reverse direction is taken as $\Delta t_{PI}$ as shown in FIG. 6(b). The optimum value of $\Delta t_{PI}$ may be zero or preferably close to zero in the point of view of suppressing the self-breakdown by attaining a value of the charging voltage $V_{PFN}$ as high as possible, and of realizing a highest possible output of the laser. On the contrary to this, setting a delay time of a certain length is indispensable for surely initiating the discharge by a time point when the voltage reaches the first peak voltage $V_{P1}$ after the switching is performed at $V_s$. Although the sustainer capacitor 11 is required to be charged with a time constant of 1-5 μs in the repetitive operation, it was found that, for the XeCl laser apparatus in the view points of output and of the stability, an optimum value of $\Delta t_{PI}$ at that time is anywhere in 100-500 ns.

EXAMPLE 5

An advantage similar to that described with reference to EXAMPLES 2-4 was also obtained with another embodiment which employed a UV preionization system. In this embodiment shown in FIG. 12, an arc discharge 27 was induced between a multiplicity of pin-electrodes 26a and 26b aligned in pairs, in lieu of the so-called surface corona discharge preionization system.

EXAMPLE 6

Figure 13:
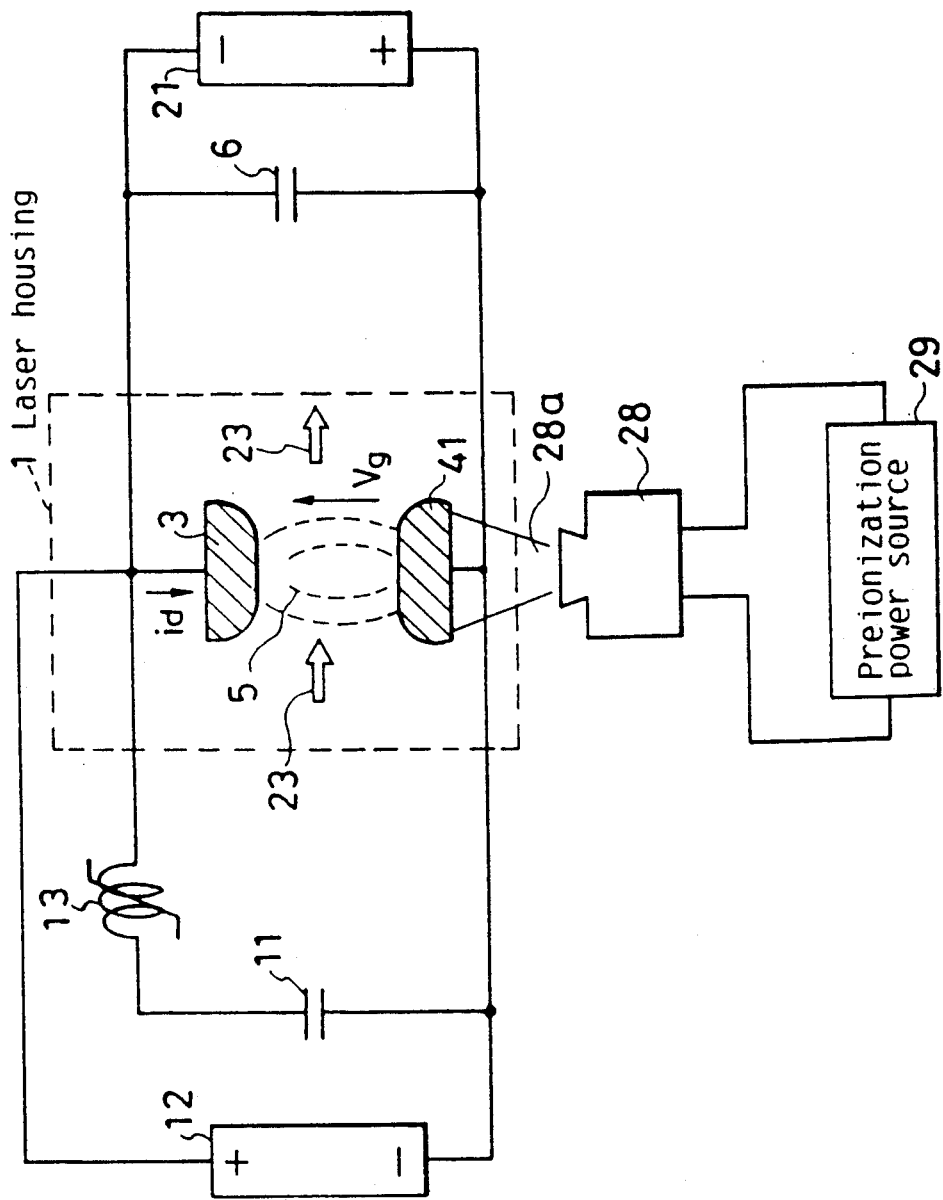
Figure 14:
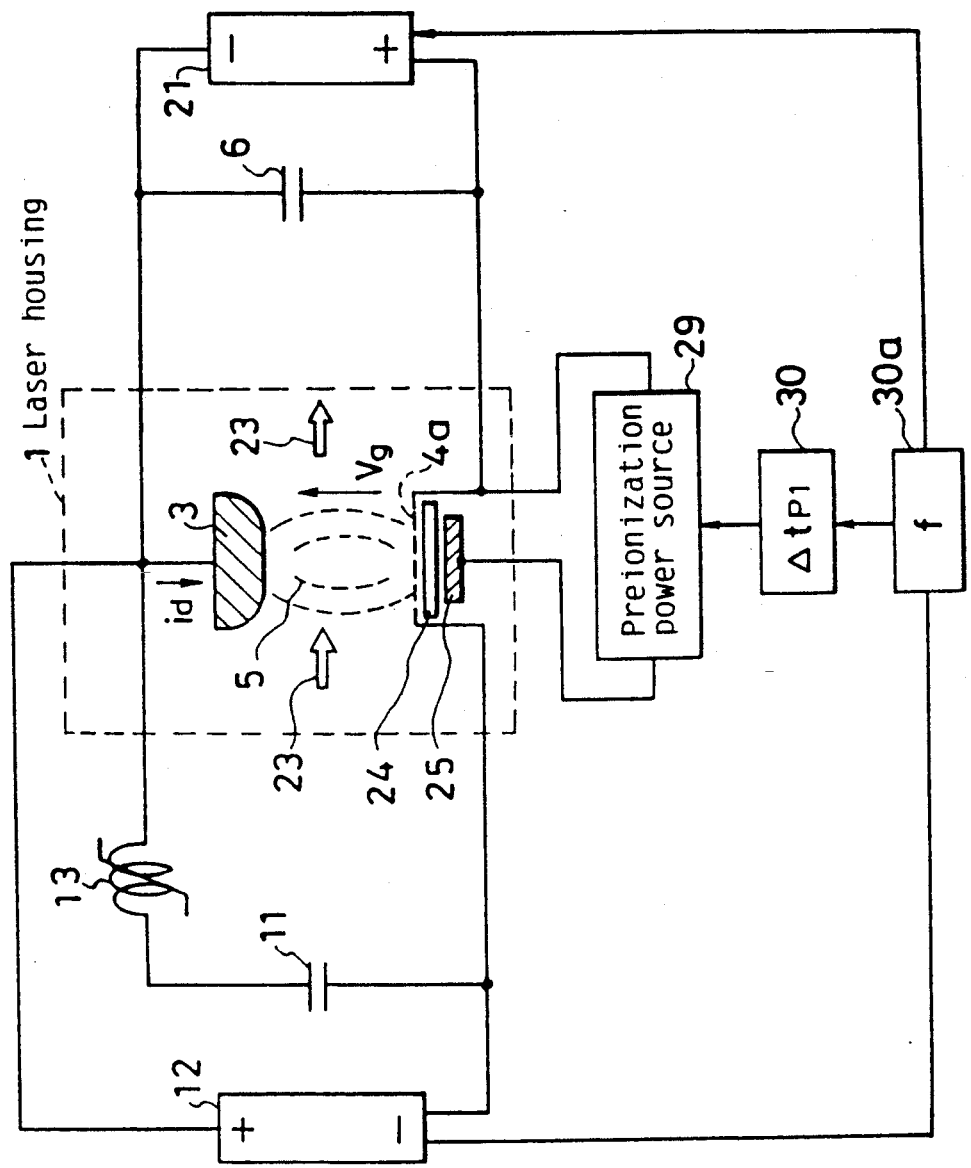

The same advantage is available with a modification of this embodiment shown in FIG. 13, wherein an X-ray preionization system including an X-ray source 28 which emits an X-ray 28a towards the second main electrode 4 and the preionization power source 29 is provided.

EXAMPLE 7

In the repetitive operation, the previous discharge may sometimes imposes an influence on the instant discharge. Since this influence depends on the repetitive frequency, the breakdown voltage and the discharge state might vary with the frequency accordingly. In the embodiment shown in FIG. 14, which is identical with FIG. 10 except that the additional provision of a means for this purpose, an circuit unit 30 for setting optimum delay $\Delta_{PI}$ for the preionization and another circuit unit 30a for setting repetition frequency f are connected in series to the preionization power source 29. By this provision, the timing for initiating the preionization is adequately controlled in response to the repetition frequency and the breakdown voltage is maintained to be constant. This means was found to be advantageous for the stable performance of the laser.

EXAMPLE 8

Figure 15:
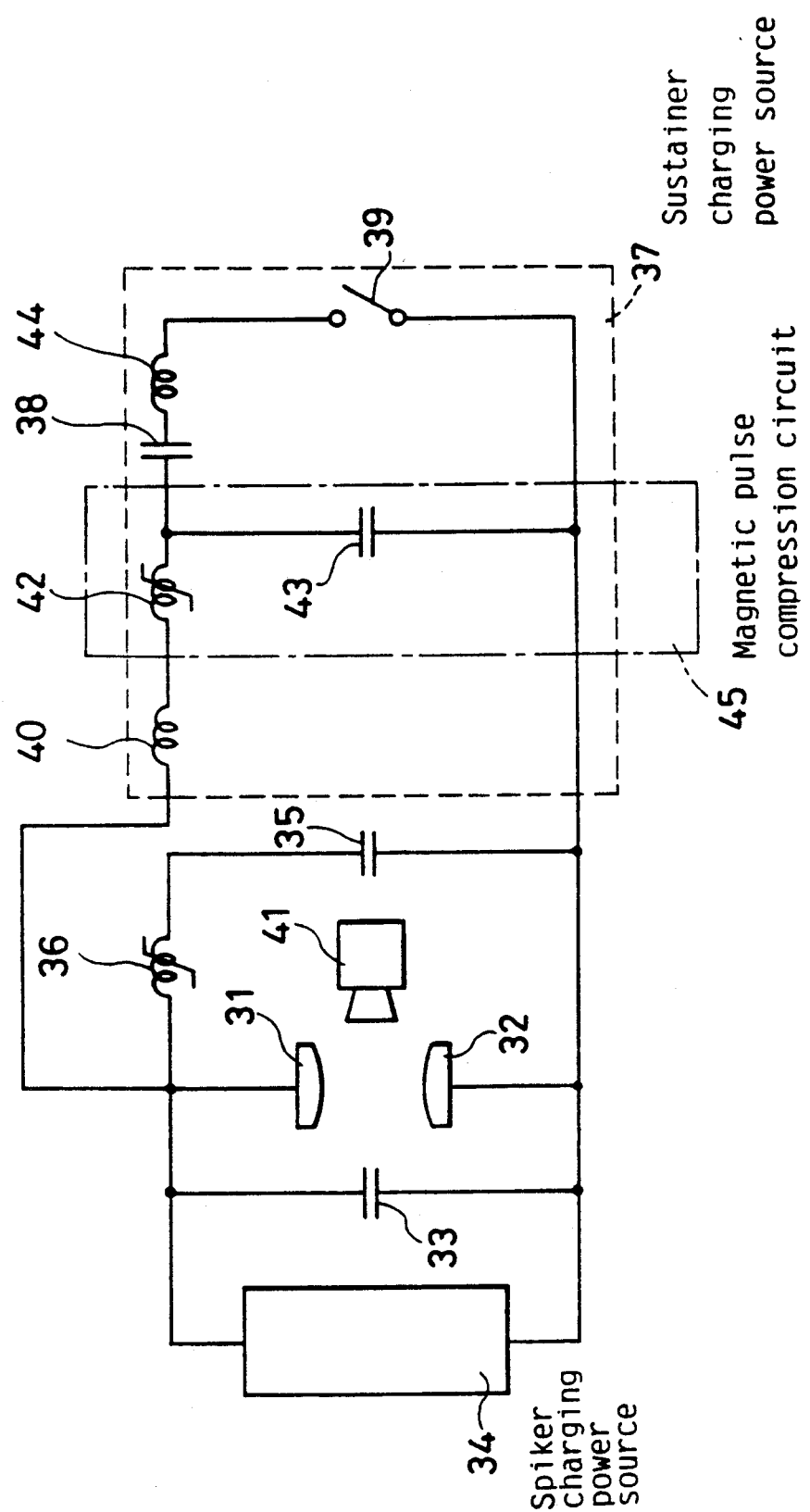
FIG. 15 is a schematic circuit diagram of another embodiment with a magnetic pulse compression circuit and a modified sustainer charging power source built in accordance with the present invention.

FIG. 15 is a schematic circuit diagram of another embodiment of the pulse laser discharge-pumping circuit built in accordance with the present invention. In this figure, the parts and components identical with or equivalent to those in the conventional example shown in FIG. 30 will be referred to by the same reference symbols or numerals, and the description therefor will be omitted here. In this circuit, a new numeral 45 generally represents a magnetic pulse compression circuit, which includes a saturable reactor 42, and a capacitor 43 both for the magnetic pulse compression circuit. In the sustainer charge power source 37, a charging time constant setting inductance 44 is provided for setting the charging time constant of the charging capacitor 43.

In the following paragraphs, the operation of this circuit of FIG. 15 will be described. In the graphs shown in FIG. 16, the time chart (a) indicates a variation in the voltage to be applied between a pair of the main electrodes 31 and 32, and the time chart (b) indicates that in the voltage across the the capacitor 43 for this magnetic pulse compression circuit, developed with the time lapse.

Figure 16A:
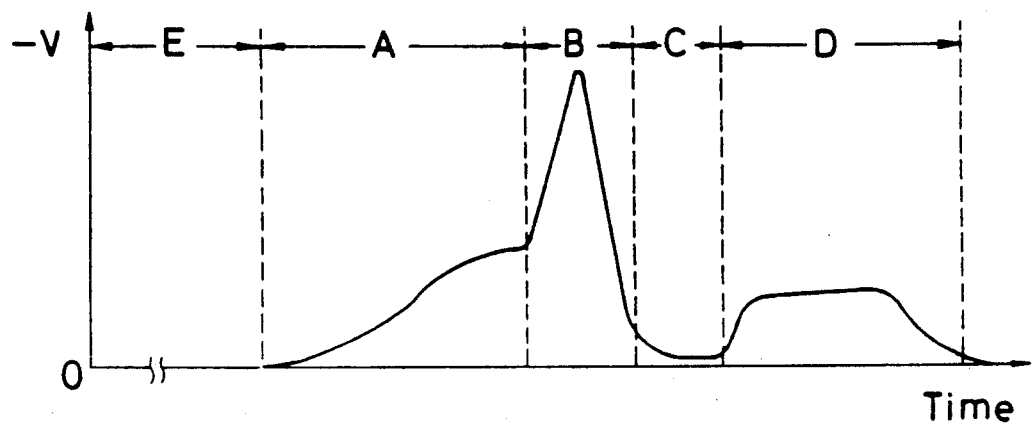
FIGS. 16A and 16B are waveform diagrams illustrating the operation of the circuit shown in FIG. 15.
Figure 16B:
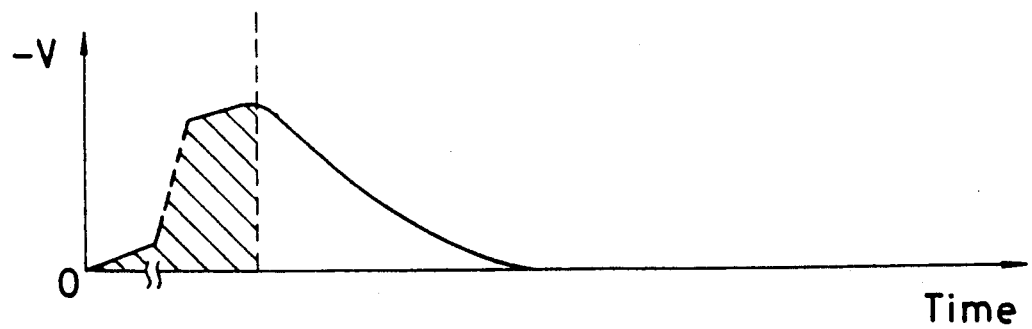

When the high voltage switch 39 is turned on, the energy stored in the charging capacitor 38 is first transferred to the capacitor 43 for this magnetic pulse compression circuit, through the high voltage switch 39 and the discharge time constant setting inductance 44, to be stored therein (period E of FIG. 16(A) and FIG. 16(B)). During this process, the stress imposed on the high voltage switch 39 can be reduced sufficiently by performing a charging to the capacitor 43 of this magnetic pulse compression circuit 45 in a slow rate in accordance with the capability of the high voltage switch 39 determined by the discharge time constant setting inductance 44.

In the circuit of this example of FIG. 15, the saturable reactor 42 for the magnetic pulse compression circuit 45 has previously been set to perform a switching, by adjusting the current flown through its secondary winding, at a time point when all of the energy stored in the charging capacitor 38 is transferred to the capacitor 43 of this magnetic pulse compression circuit 45. By being set as above-described, energy stored in the capacitor 43 of this magnetic pulse compression circuit 45 is transferred to the sustainer capacitor 35 through the saturable reactor 42 of this magnetic pulse compression circuit 45 and the charging time constant setting inductance 40, and at the same time, the energy from the charging capacitor 38 is also transferred to the spiker capacitor 33 through the magnetic isolator 36, thereby to raise the voltage across the main electrodes 31 and 32 (in period A of FIG. 16). An upper limit of the voltage is determined by the discharge initiating voltage $V_b$ across the main electrodes 31 and 32.

Figure 30:
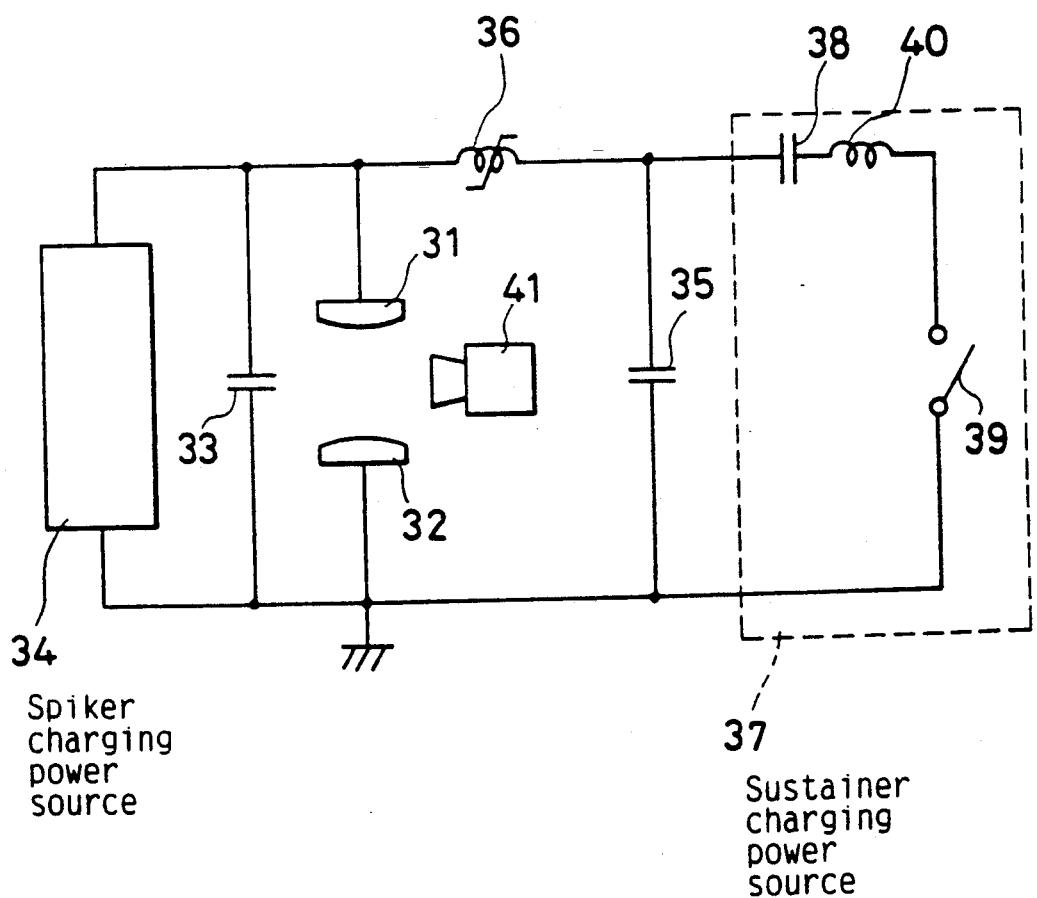
FIG. 30 is the schematic circuit diagram of the example of the conventional discharge-pumping laser device having a means for preionizing the laser gas and a modified sustainer charging power source.
Figure 31:
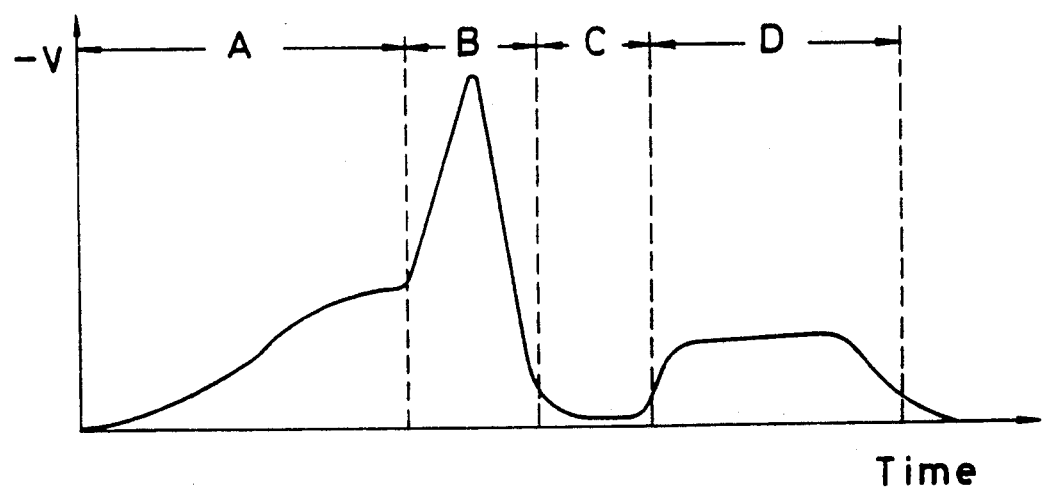
FIG. 31 is the graph illustrating the operation of the circuit shown in FIG. 30.

The shorter the time constant Tc for charging of the sustainer capacitor 35 is, the higher becomes the discharge initiating voltage $V_b$ as described previously with respect to the prior arts shown in FIG. 30.

In this aspect of the present invention, the magnetic pulse compression circuit 45 is provided between the charging capacitor 38 and the sustainer capacitor 35. Thus, the charging time constant Tc can be made shorter value of, say, several fraction of the time required for the charge transferring from the charging capacitor 38 to the capacitor 43 without increasing the stress on the high voltage switch 39. Thus, the breakdown voltage $V_b$ can be made sufficiently high, thereby enabling the sustainer capacitor 35 to store a larger energy.

Thereafter, a high voltage is induced across the spiker capacitor 33 by operation of the spiker charging power source 34, so as to develop a discharge between the main electrodes 31 and 32, when the voltage across the main electrodes exceeds $V_b$ (in period B of FIG. 16). When the discharge is developed, the voltage across the main electrodes 31 and 32 drops abruptly (in period C of FIG. 16), then the magnetic isolator 36 is made ON. Thereby the large quantity of energy stored in the sustainer capacitor 35 is injected into the developed discharge through the magnetic isolator 36, thus exciting the laser gas (in period D of FIG. 16) and generating a large laser energy.

EXAMPLE 9

Another important mode of embodiment is an apparatus of "reversed mode", shown in FIGS. 18 and 19 wherein the polarity of the charging voltage of the sustainer capacitor 35 is opposite to that of the spiker capacitor 33, as opposed to the above-mentioned "same directional mode" as described with reference to FIGS. 15 and 16 of EXAMPLE 8.

Figure 18:
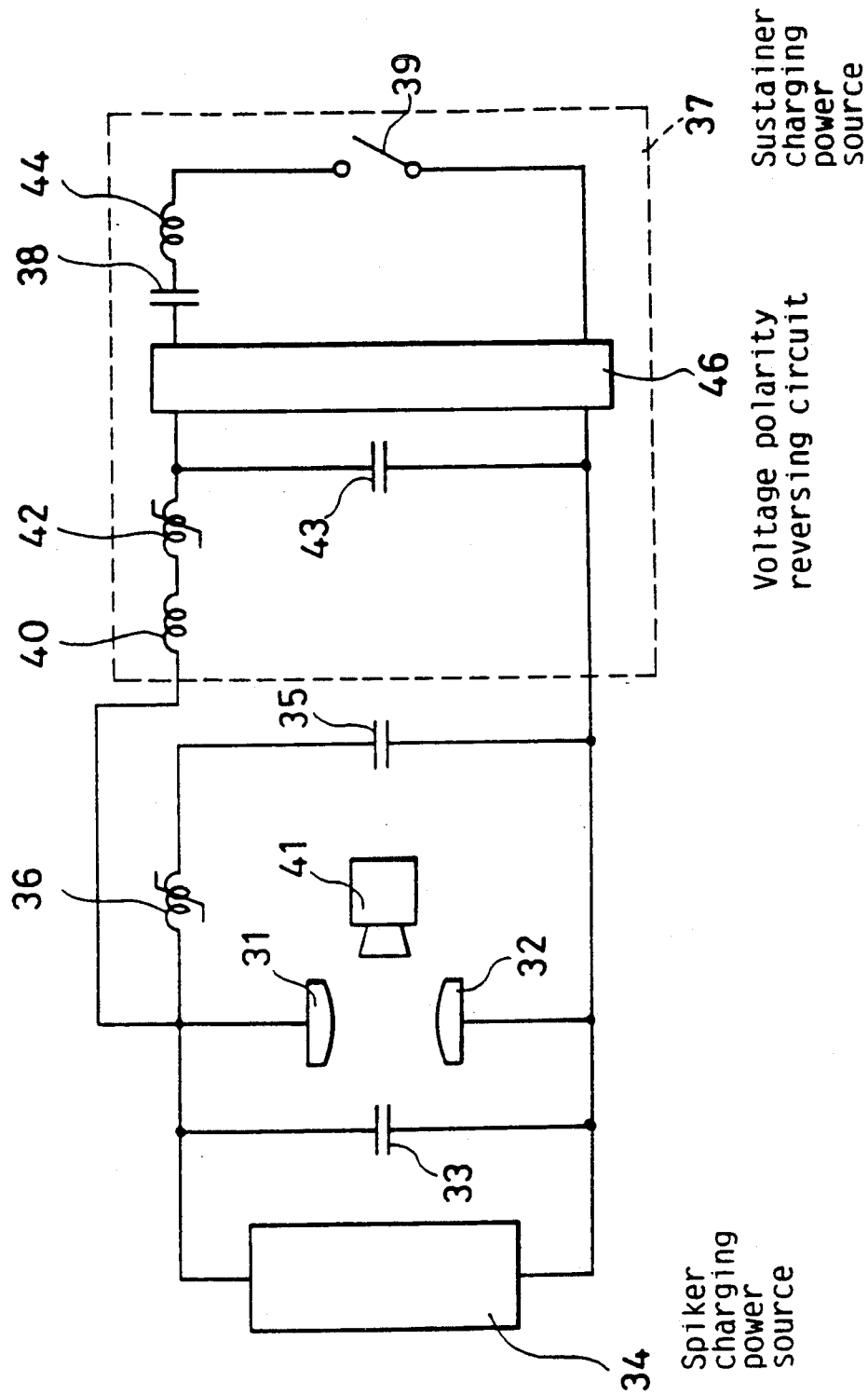
FIG. 18 is a schematic circuit diagram of another embodiment with the magnetic pulse compression circuit and a voltage polarity reversing circuit built in accordance with the present invention.

In this embodiment shown in FIG. 18, the parts and components identical with or equivalent to those shown in FIG. 15 will also be referred to by the same reference symbols or numerals, and the description therefor is applicable to this example. A new numeral 46 designates a voltage polarity reversing circuit included in FIG. 18.

Figure 19A:
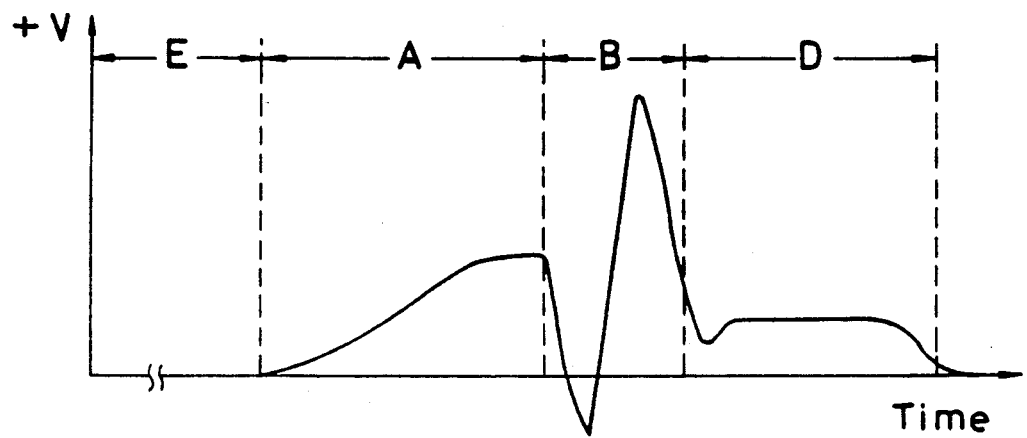
FIGS. 19A and 19B are waveform diagrams illustrating the operation of the circuit shown in FIG. 18.
Figure 19B:
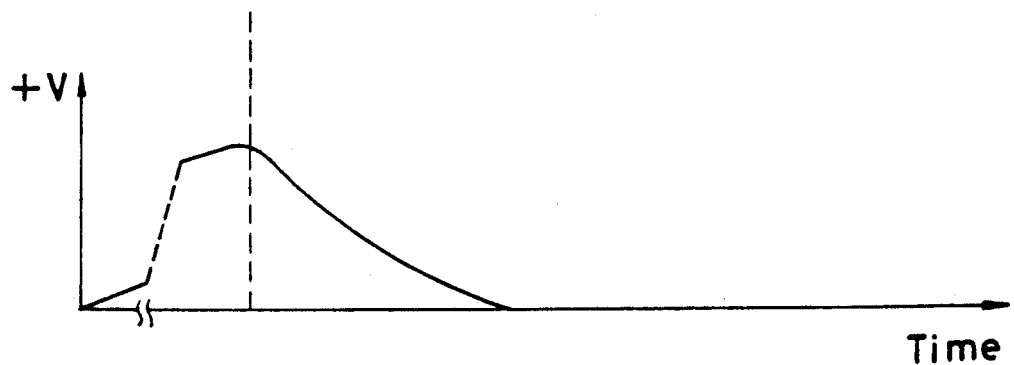

In the following paragraphs, the operation of this circuit will be described by referring to graphs shown in FIG. 19, wherein the time chart FIG. 19(A) shows voltage variations across the main electrodes 31 and 32, and time chart (b) shows the voltage variation of the capacitor 43 of the magnetic pulse compression circuit 45. When the high voltage switch 39 is turned on, the energy stored in the charging capacitor 38 is transferred to the capacitor 43 of the magnetic pulse compression circuit 45 through the high voltage switch 39 and the voltage polarity reversing circuit 46, thereby to be stored therein although, the polarity of the voltage is positive (period E of FIG. 19). Next, when all of the energy stored in the charging capacitor 38 is transferred to the capacitor 43 for the magnetic pulse compression circuit 45, the stored energy is transferred to the sustainer capacitor 35 through the saturable reactor 42 for the magnetic pulse compression circuit 45 and the switching device 36, and further to the spiker capacitor 33 through the saturable reactor 42 for the magnetic pulse compression circuit, thereby to raise the voltage across the main electrodes 31 and 32 (period A of FIG. 19).

At a time point when the charging for the sustainer capacitor 35 is completed, a certain voltage appears across both ends of across the spiker capacitor 33. The polarity of the spiker capacitor 33 is opposite to that of the charging voltage for the sustainer capacitor 35 by the spiker charging power source 34. At the same time, by making the magnetic isolator 36 saturate, a sudden transfer of the charge from the sustainer capacitor 35 to the spiker capacitor 33 occurs. Thereby, a high voltage is induced across the spiker capacitor 33, and when the voltage across the main electrodes exceeds $V_b$, a discharge between the main electrodes 31 and 32 is developed (period B of FIG. 19). When the discharge is developed, the energy stored in the sustainer capacitor 35 is injected into the developed discharge through the switching device 36, thereby to excite the laser gas (period D of FIG. 19) and to emit a laser beam. The voltage reversing circuit 46 in this embodiment serves not only for reducing the stress on the high voltage switch but also for preventing its deterioration, because the saturable reactor 42 of the magnetic pulse compression circuit 46 is capable of preventing the application of the high voltage developed across the main electrodes 31 and 32, directly to the high voltage switch 39.

EXAMPLE 10

In a modification of the above-described embodiment shown with reference to FIGS. 15, 17 or 18, wherein a X-ray source is used as the preionization power source, a surface corona discharge preionization is used as in the case of EXAMPLE 4 shown in FIG. 10. The preionization is performed by utilizing a corona discharge produced at the multiplicity of openings provided on one of the main electrodes 4a behind which a dielectric material body 24 and the auxiliary electrode 25 of FIG. 10 are closely fixed. It is found that the preionization by means of corona discharge is also excellent in the repetitive operation to improve the laser performance, in this embodiment.

EXAMPLE 11

As previously described, the operation of charging the sustainer capacitor 35 is initiated by the saturation state of the saturable reactor 42 of the magnetic pulse compression circuit in this aspect of the present invention. The conditions for the saturation state of the saturable reactor are determined by the product of the voltage to be applied to the saturable reactor and the time, which product corresponds to the integral of the voltage Vi(t) across the capacitor 43 of the magnetic pulse compression circuit by time, i.e., the hatched area under the curve (b) shown in FIG. 17. Therefore, it is difficult to accord the time point of charge completion for the sustainer capacitor 35 to the operation timing of the spiker charging power source 34, because the timing of saturation state of the saturable reactor 42 of the magnetic pulse compression circuit varies with the voltage.

Figure 20:
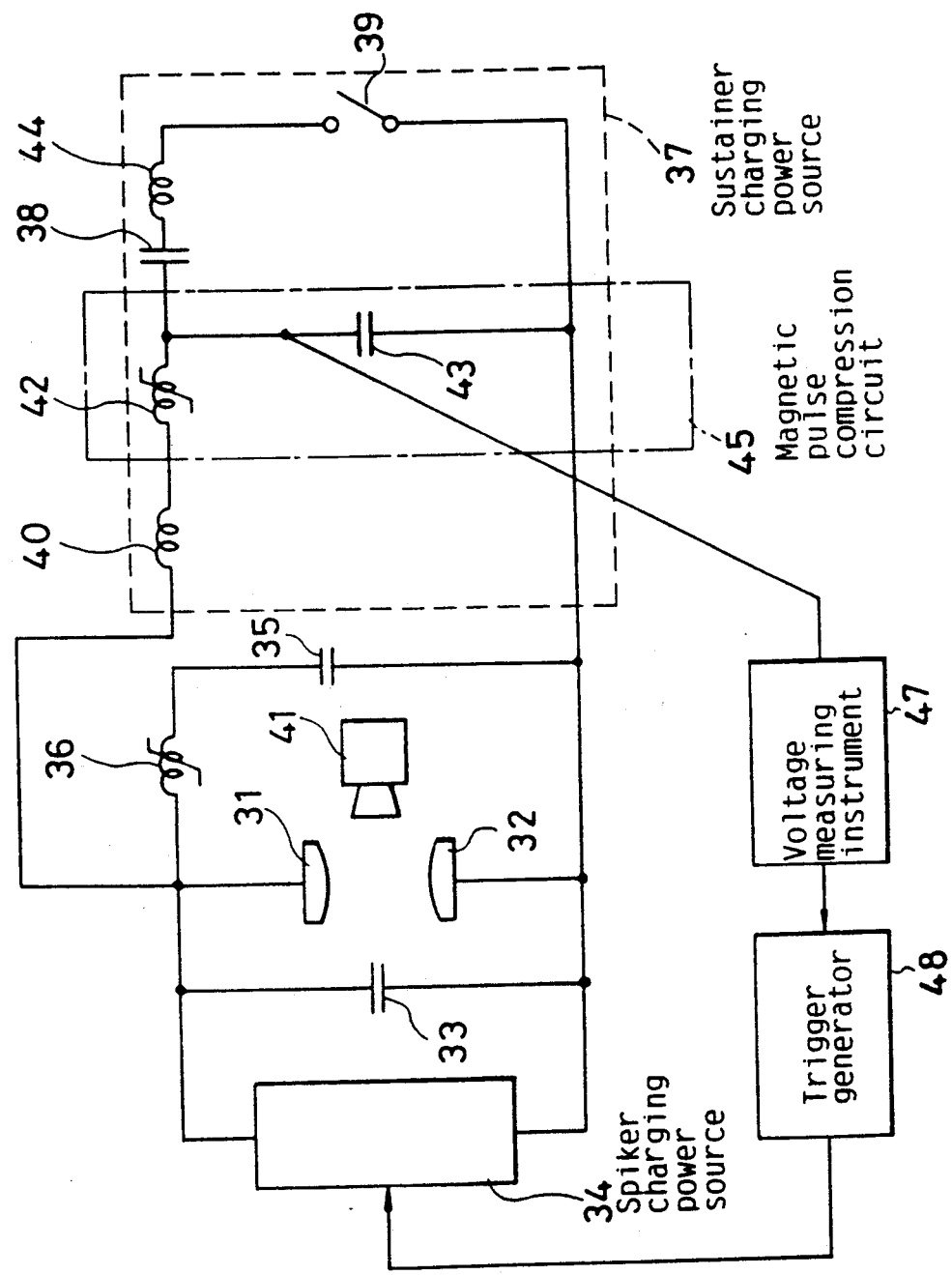
FIGS. 20, 21, 22, 23 and 24, each is a schematic circuit diagram of another embodiment which is a modification of the embodiment shown in FIG. 15.

The circuit diagram shown in FIG. 20 is an embodiment which intends to overcome this difficulty and illustrates a circuit operation timing controlling system. Corresponding parts and components to the first embodiment are shown by the same numerals and marks, and the description thereon made in the previous EXAMPLE are similarly applicable. Differences and features of this EXAMPLE from the previous EXAMPLE of FIG. 18 are as follows. In this figure, a new numeral 47 designates a voltage measuring instrument for detecting the saturation/unsaturation state of the saturable reactor 42 of the magnetic pulse compression circircuit, and a numeral 48 designates a delayed trigger generator. The trigger generator 48 generates a trigger signal for actuating the spiker charge power source 34, after the input of the detection signal followed by a delay of a given duration.

In this circuit, since the operation of charging the sustainer capacitor 35 by the capacitor 43 of the magnetic pulse compression circuit is initiated by the saturation state of the saturable reactor 42 of the magnetic pulse compression circuit, the voltage across the capacitor 43 of the magnetic pulse compression circuit drops and the voltage drop is detected by the voltage measuring instrument 47, and then the spiker charging power source 34 is actuated based on the result of the measurement. Since the time constant Tc for charging the sustainer capacitor 35 is fixed by the charging time constant setting inductance 40, the time point of the completion of charging the sustainer capacitor 35 can accurately be set to the actuation timing of the spiker charge power source 34.

EXAMPLE 12

Figure 21:
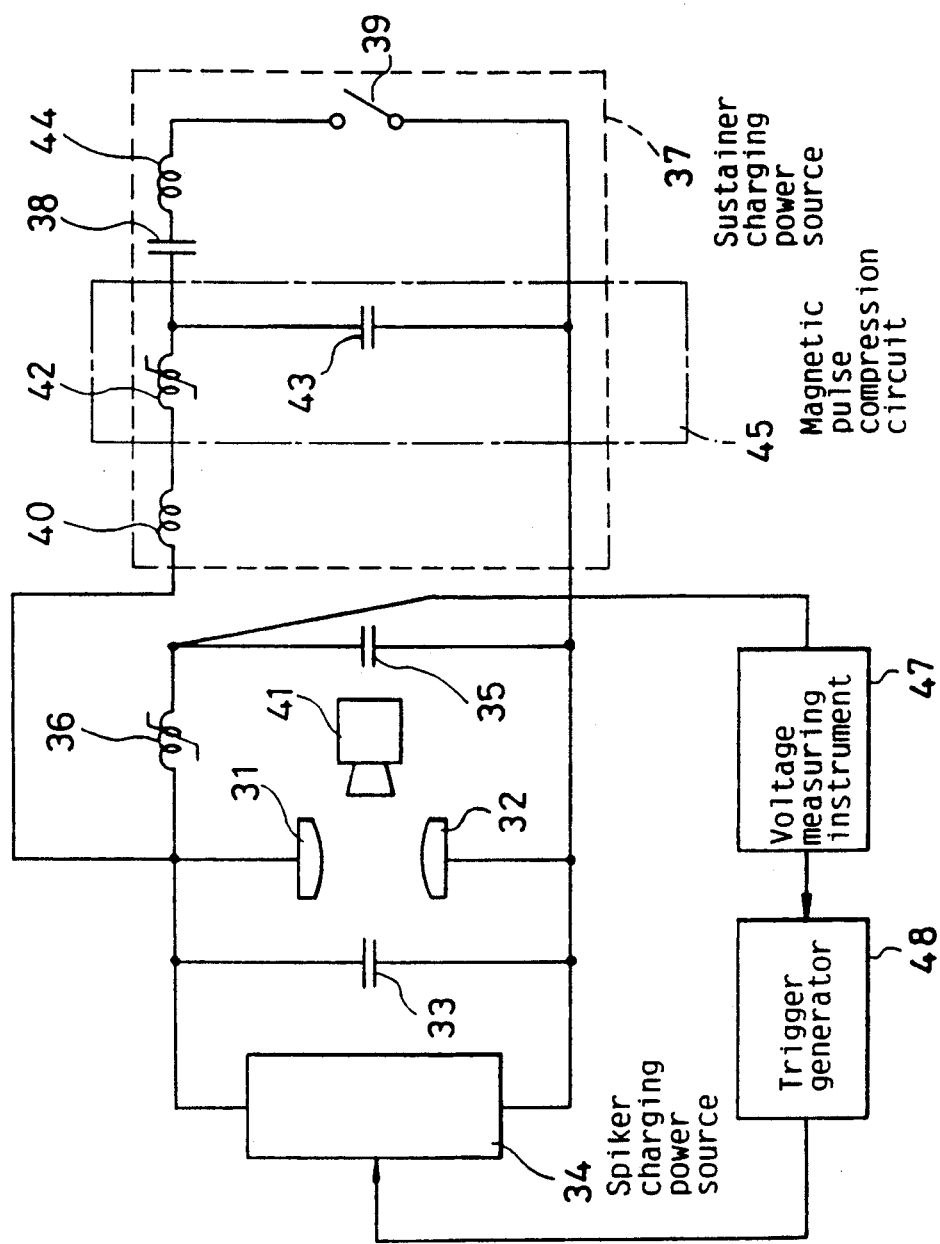

In the previous EXAMPLE 11, a voltage measuring instrument is used for detecting the saturation/unsaturation state of the saturable reactor 42 of the magnetic pulse compression circuit, it is needless to say that a similar advantage is obtained by measuring the voltage across the sustainer capacitor 35 as illustrated in FIG. 21.

EXAMPLE 13

Figure 23:
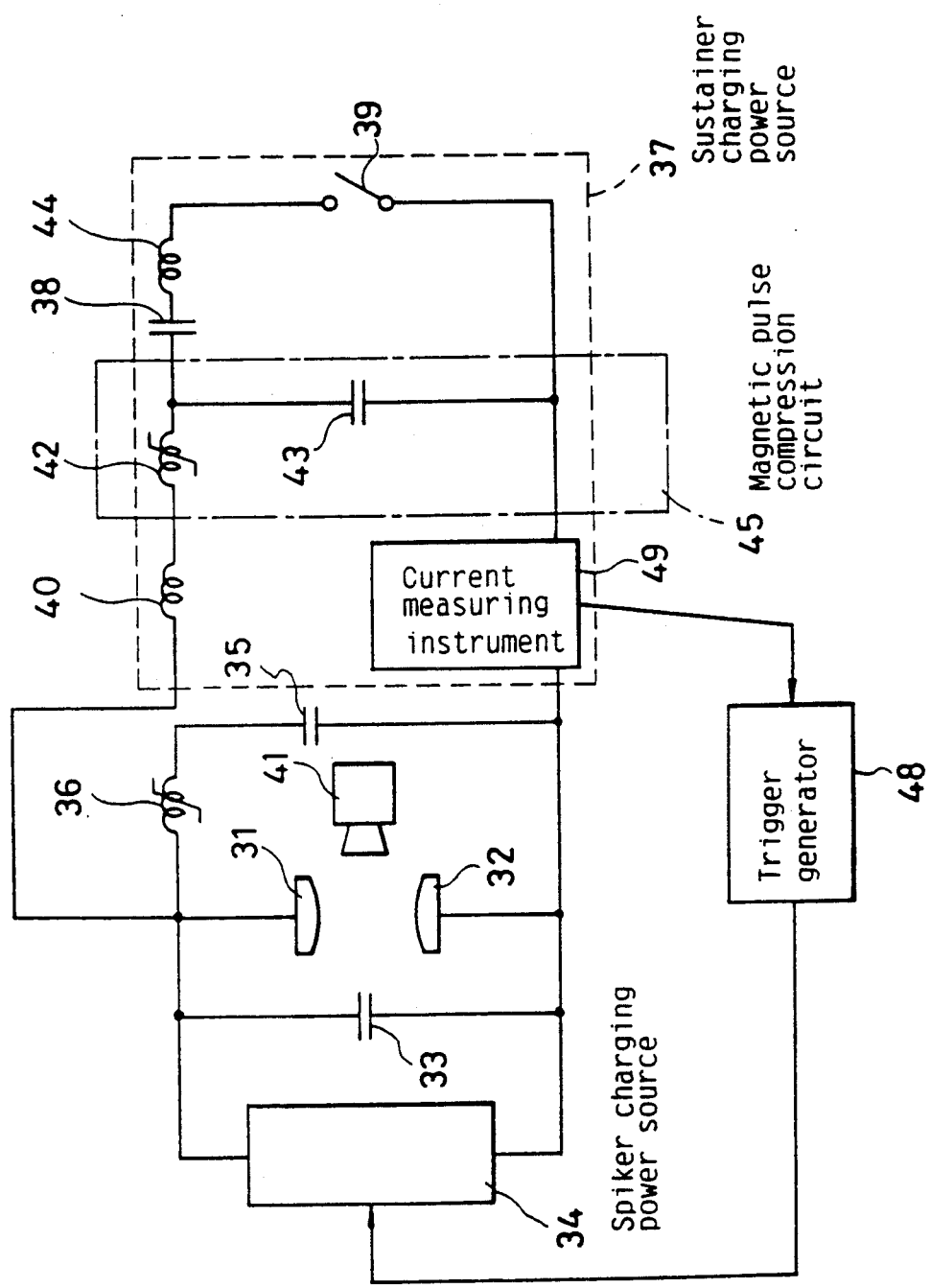

In a modified circuitry shown in FIG. 23, a current measuring instrument 49 is employed as a means for detecting the saturation/unsaturation state of the saturable reactor 42 of the magnetic pulse compression circuit 45.

EXAMPLE 14

Figure 22:
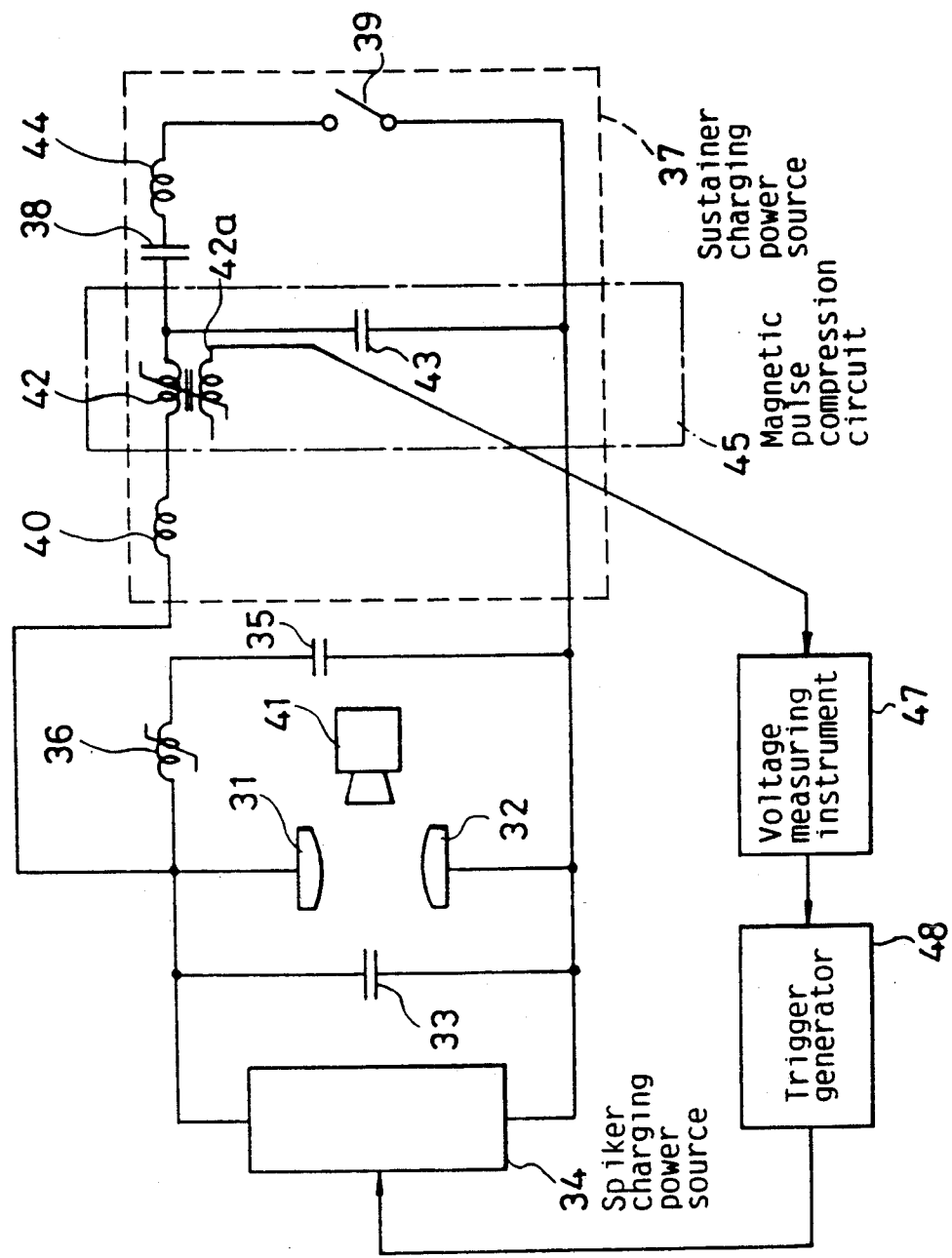

In another modified circuitry shown in FIG. 22, a secondary winding 42a is provided on the saturable reactor 42 of the magnetic pulse compression circuit and the voltage across the secondary winding is measured to detect the saturation/unsaturation state. As the above-mentioned secondary winding, a winding for resetting originally provided in the saturable reactor 42 of the magnetic pulse compression circuit may be diverted to utilize it for the same purpose.

EXAMPLE 15

Incidentally, the discharge initiating voltage varies with the repetition frequency in the repetitive pulse laser. Thus, when the laser is operated under the same operating conditions regardless of the repetition frequency, the discharge becomes unstable and the variation in the laser output becomes undesirable large, accordingly.

Figure 24:
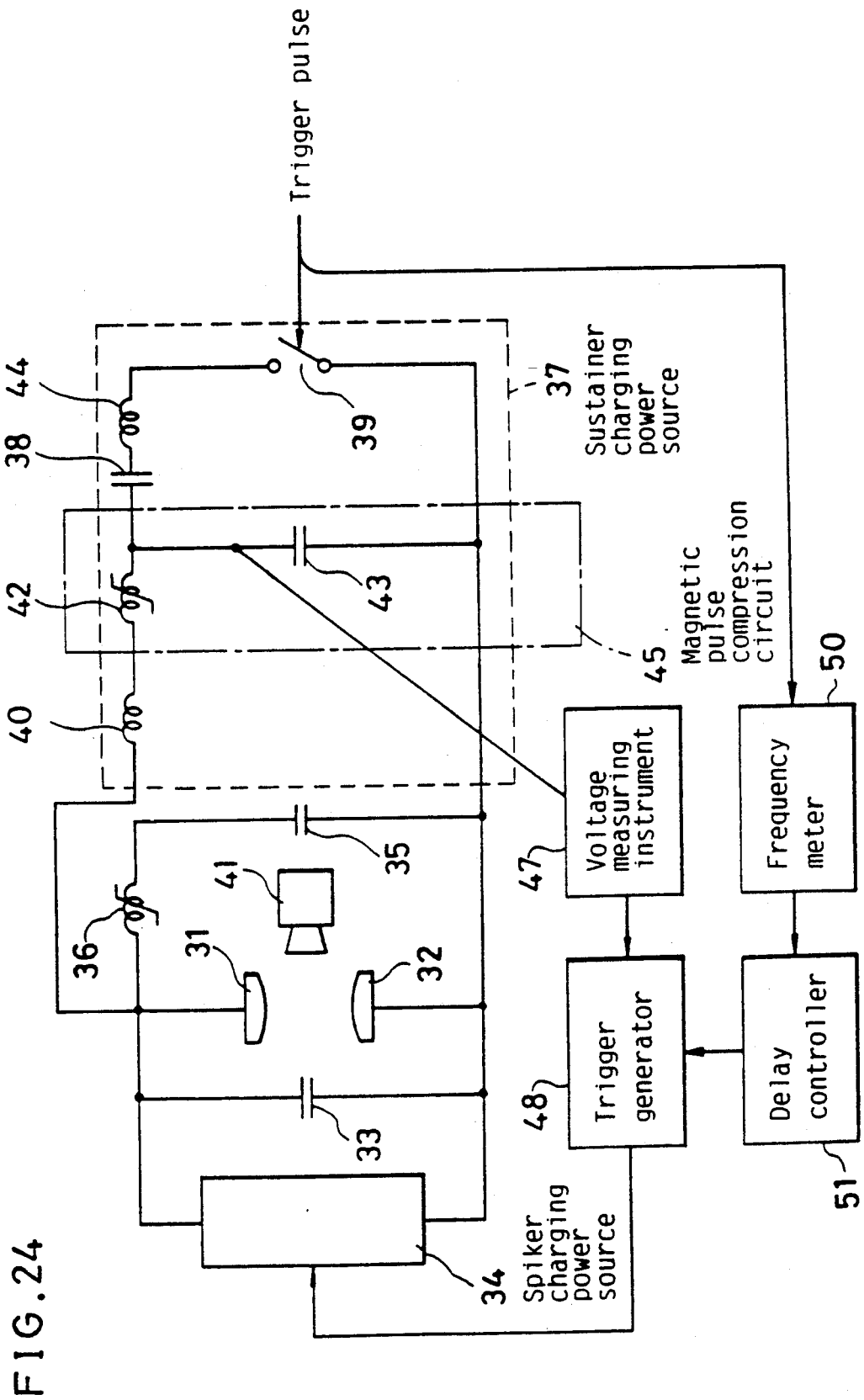
Figure 25:
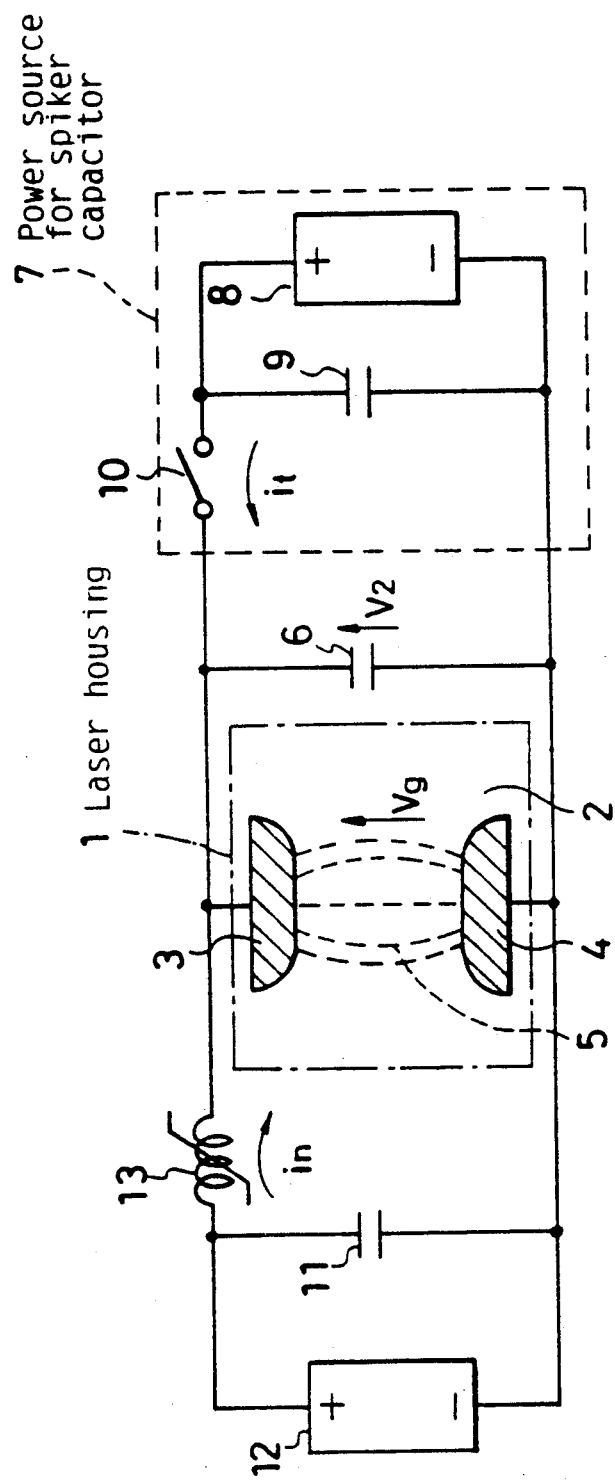
FIG. 25 is a schematic circuit diagram of an example of the conventional discharge-pumping laser device.
Figure 26A:
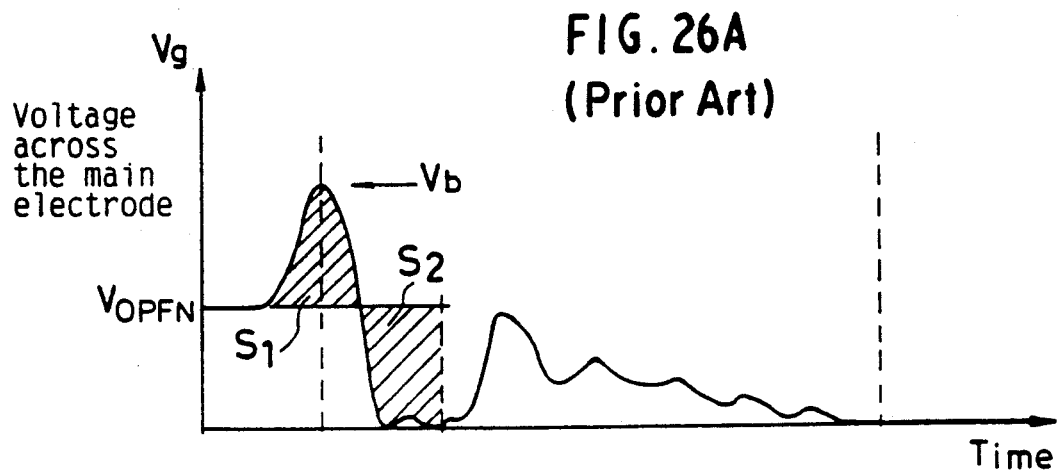
FIGS. 26A-26C are waveform diagrams illustrating the operation of the circuit shown in FIG. 25.
Figure 26B:
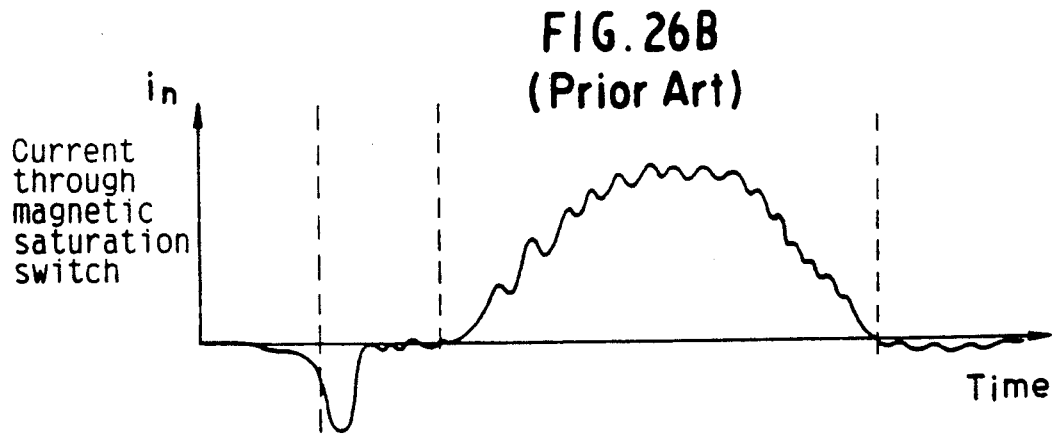
Figure 26C:
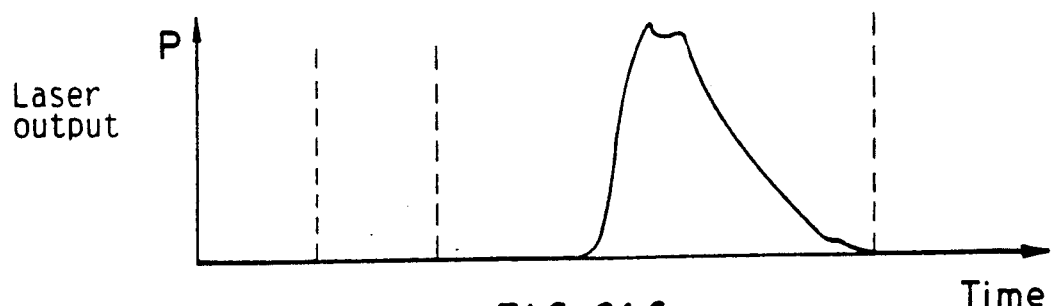
Figure 27:
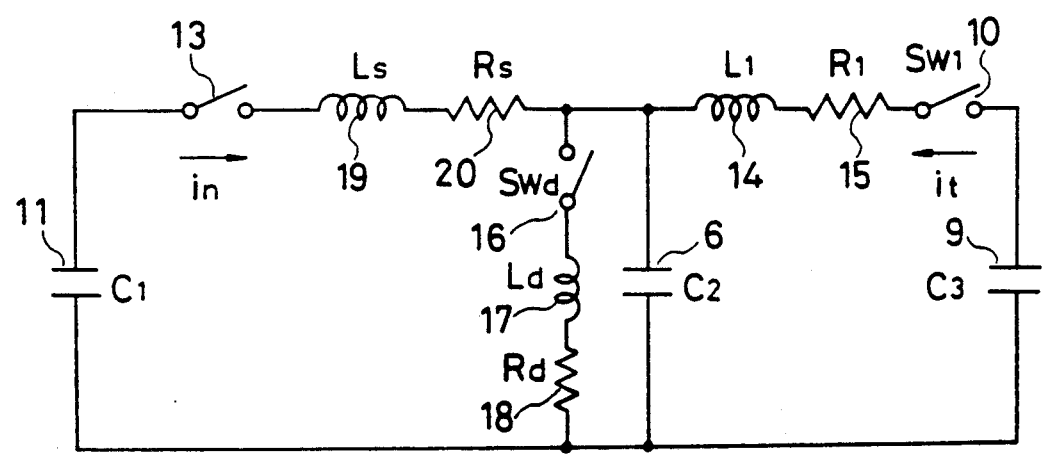
FIG. 27 is an equivalent circuit diagram of the device shown in FIG. 25.

In the embodiment shown in FIG. 24, a controlling system for solving the above-stated problem is provided, whereby the delay time set by the above-mentioned delay trigger generator 48 is made a function of the repetition frequency and the delay time is selected in accordance with the repetition frequency. The delay time, defined here, is an interval between the time point when the high voltage switch turns ON and that when the spiker charging power source 34 is actuated.

In addition to the circuitry shown in FIG. 20, a frequency meter 50 and a delay controller 51 connected to the delay trigger generator 48 are provided in the circuitry shown in FIG. 24 for this purpose. The frequency meter 50 is supplied with another trigger pulse which also actuates the high voltage switch 39, and counts the trigger pulse to output a control signal for the delay controller 51 based on the number of the count. The delay controller 51 calculates an appropriate delay time based on the data which has previously been stored therein, to outputs a delay time command to the trigger generator 48. The trigger generator 48 starts to operate upon the signal from the voltage measuring instrument 47 as a reference time point and generate a trigger signal for actuating the spiker charging power source 34, after the lapse of the appropriate delay time included in the command supplied by the delay controller 51.

By being provided with this means, the laser output becomes more stable and the repetitive pulse laser of high reliability is realized.

EXAMPLE 16

Although the circuitry, which has only one stage of the magnetic pulse compression circuit 45, is shown in the above-mentioned embodiments, the magnetic pulse compression circuit of multiple stages may be provided in the circuit for shortening the charging time constant as shown in FIG. 17.

Although the present invention has been described in its preferred form with a certain degree of particularity, it is understood that the present disclosure of the preferred form has been changed in the details of construction and the combination and arrangement of parts and components may be resorted to without going out from the spirit and the scope of the invention as hereinafter claimed.

What is claimed is:
1. In a laser oscillator circuit including;

a laser housing filled with a laser gas, a first main electrode and a second main electrode which are contained in said housing in a manner that one faces the other, a spiker capacitor connected in parallel with said first and second main electrodes, a sustainer capacitor connected in parallel with said first and second main electrodes through a magnetic isolator, therebetween, a spiker charging power source for charging said spiker capacitor, and a sustainer charging power source which charges said sustainer capacitor in an opposite polarity with respect to said spiker charging power source charging said spiker capacitor;

a laser oscillator circuit characterized in that;

said magnetic isolator is configured so that: it shifts from an OFF state to an ON state, during a process of charging said spiker capacitor by said spiker charging power source in a polarity opposite to that of said sustainer capacitor which had first been charged by said sustainer charging power source, before a terminal voltage of said spiker capacitor reaches a breakdown voltage which allows an initiation of discharge between said first and second main electrodes, in a manner such that said shift causes an application of a sharp-rise pulse voltage across said first and second main electrodes by a transfer of electric charge from said sustainer capacitor to said spiker capacitor, to initiate the discharge between said first and second electrodes in a polarity opposite to that of said spiker charging power source.

2. The laser oscillator circuit as claimed in claim 1, wherein; capacitance of said sustainer capacitor is far greater than that of the spiker capacitor, an absolute value of spiker charging voltage $|V_S|$ is not less than 0.6 times as high as that of the breakdown voltage $|V_b|$, and stray inductance $L_s$ along a loop through which the discharge current of the sustainer capacitor flows is far smaller than that $L_1$ along the loop through which the discharge current of the spiker capacitor flows.

3. The laser oscillator circuit as claimed in claim 2, wherein said magnetic isolator is configured to have a characteristics satisfying the formula:

$$(Bs+Br)S < 1/2(V_{OPFN} - V_b)\Delta t_b$$

wherein;

Bs is a saturation magnetic flux density,
Br is a residual magnetic flux density,
S is a core cross-sectional area of a magnetic substance in the magnetic isolator,
$V_{OPFN}$ is a spiker charging voltage,
$V_b$ is an inherent breakdown voltage, and
$\Delta t_b$ is a time delay between initiation of spiker reverse charging and inherent breakdown of the laser.

4. The laser oscillator circuit as claimed in claim 1, wherein said circuit further includes a preionization source for preionizing the laser gas in a space between said first and second main electrodes and is of a repetitive operation having a repetition rate of at least three times for one second, a laser oscillator circuit characterized in that;

said preionization source initiating the preionization of said laser gas, after the initiation of charging said sustainer capacitor and before initiation of charging said spiker capacitor by said first power source, and controlling said breakdown voltage across said first and second main electrodes developed by an application of a sharp-rise pulse, to be constant.

5. The laser oscillator circuit as claimed in claim 4, wherein; a time constant for charging said sustainer capacitor is in a range of 1-5 μs and current for the preionization is initiated 100-500 ns before the initiation of the charging of the spiker capacitor.

6. The laser oscillator circuit as claimed in claim 5, which further comprises; a means for controlling operation timing of said preionization source in accordance with frequency of said repetitive operation.

7. The laser oscillator circuit as claimed in claim 1, 2, 3, 4, 5 or 6, wherein said laser oscillator is of repetitive operation, and said second power source for charging said sustainer capacitor comprises at least one stage of a magnetic pulse compression circuit.

8. The laser oscillator circuit as claimed in claim 7, which further comprises;

a means for detecting operation of said magnetic pulse compression circuit and for generating a detection signal, a trigger controlling circuit for generating a signal for triggering said first power source and for charging said spiker capacitor in a predetermined delay after generation of said detection signal, and a control means for adjusting timing for charging said sustainer capacitor in response to timing for charging said spiker capacitor.

9. The laser oscillator circuit as claimed in any of claim 1 or 2, wherein said laser gas flows through said laser housing as a stream.

10. In a laser oscillator circuit including;

a laser housing filled with a laser gas which flows into said housing as a stream, a first main electrode and a second main electrode both contained in said housing in positions where one faces the other, a spiker capacitor connected in parallel with said first and second main electrodes, a sustainer capacitor connected in parallel with said first and second main electrodes through a switching device, a first power source for charging said spiker capacitor, a second power source which charges said sustainer capacitor, and a preionization source for preionizing laser gas in a space between said first and second main electrodes;

a laser oscillator circuit characterized in that;

said second power source for charging said sustainer capacitor comprises at least one stage of a magnetic pulse compression circuit unit.

11. The laser oscillator circuit as claimed in claim 10, which further comprises;

a means for detecting operation of said magnetic pulse compression circuit and for generating a detection signal, a trigger controlling circuit means for generating a. signal for triggering said first power source and for charging said spiker capacitor in a predetermined delay after generation of said detection signal, and a control means for adjusting timing for charging said sustainer capacitor in response to timing of charging said spiker capacitor.

* * * * *

UNITED STATES PATENT AND TRADEMARK OFFICE
CERTIFICATE OF CORRECTION

PATENT NO. : 5,181,217

DATED : January 19, 1993

INVENTOR(S) : YUKIO SATO ET AL

It is certified that error appears in the above-identified patent and that said Letters Patent is hereby corrected as shown below:

In column 3, lines 42-45, change the formula

" $C_{23} = \dfrac{C_2 \times C_3}{C_2 - C_3}$ " to -- $C_{23} = \dfrac{C_2 \times C_3}{C_2 + C_3}$ -- .

In column 12, line 55, change the formula

"$(dV_2/dt)_{ave} \approx (1/\pi) \times (2V_{OPEN} - V_s) \times (L_s \times C_2)^{-\frac{1}{2}}$     (3)." to --$(dV_2/dt)_{ave} \approx (1/\pi) \times 2(V_{OPEN} - V_s) \times (L_s \times C_2)^{-\frac{1}{2}}$     (3).--;

line 63, change "820kV/$\mu$s" to --1230kV/$\mu$s--;

line 64, change "twice" to --three times--.

In column 23, line 67, change "said first power source" to --said spiker charging power source--.

UNITED STATES PATENT AND TRADEMARK OFFICE
CERTIFICATE OF CORRECTION

PATENT NO. : 5,181,217

DATED : January 19, 1993

INVENTOR(S) : YUKIO SATO ET AL

It is certified that error appears in the above-identified patent and that said Letters Patent is hereby corrected as shown below:

In column 24, line 15, change "said second power source" to --said sustainer charging power source--;

line 24, change "said first power source" to --said spiker charging power source--.

Signed and Sealed this

Fifth Day of April, 1994

BRUCE LEHMAN

*Attest:*

*Attesting Officer*  *Commissioner of Patents and Trademarks*